Inventors:
Frederick P. Netznik
Patrick J. McCauley
By Brown, Jackson, Boettcher & Dienner INVENTORS.
Frederick P. Netznik
Patrick J. McCauley

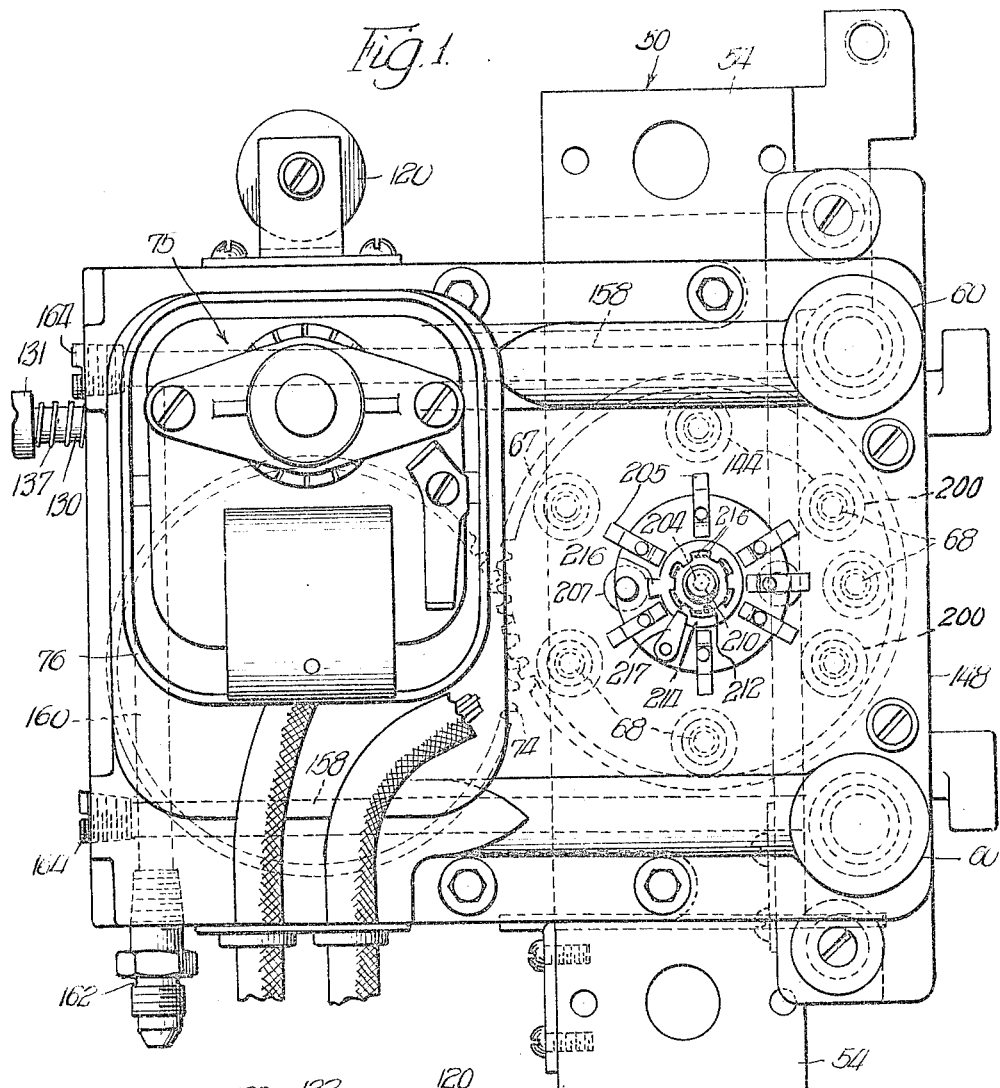
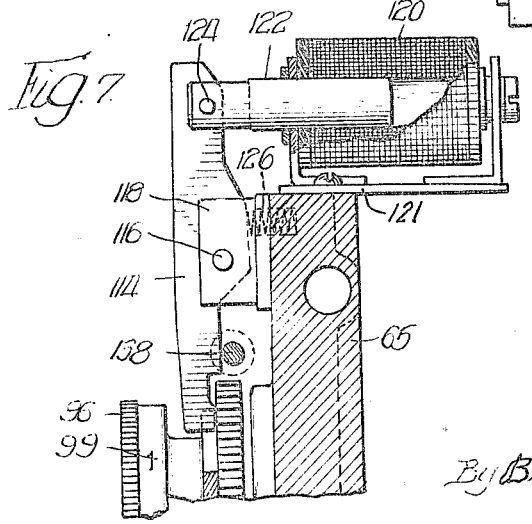

FIG. 13

INVENTORS.
Frederick P. Netznik
Patrick J. McCauley
BY *[signature]*
ATTYS.

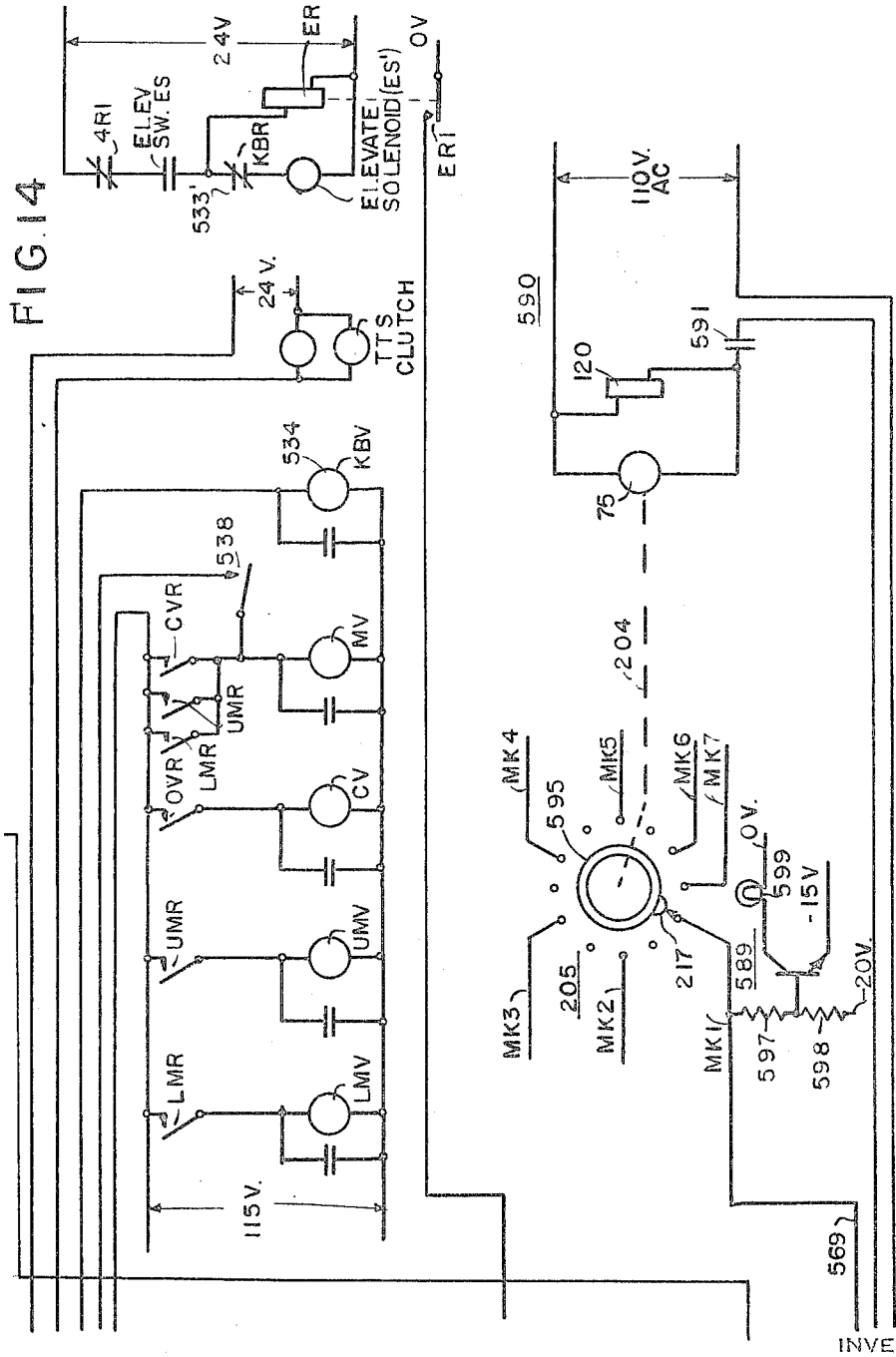

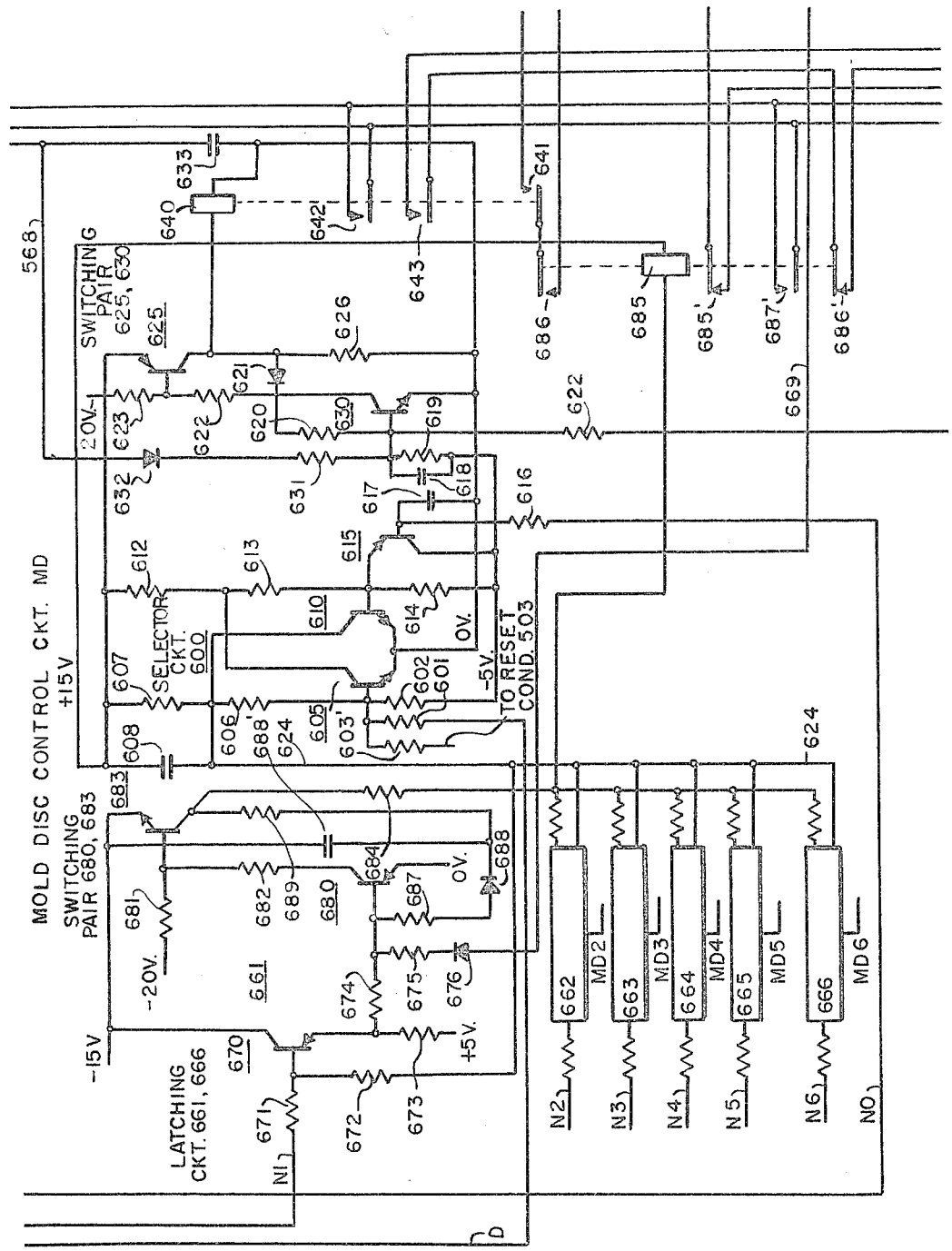

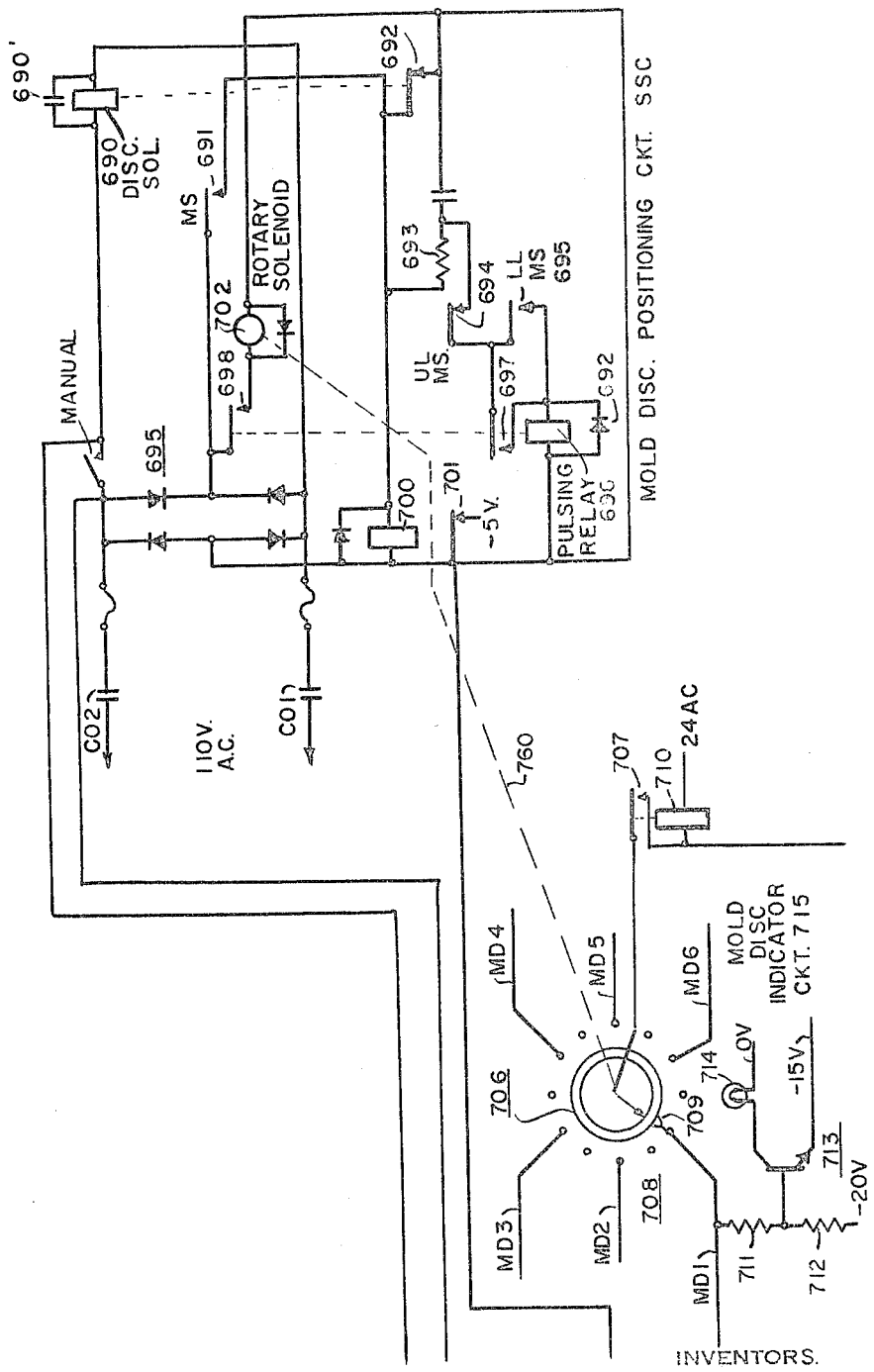

United States Patent Office 3,291,294
Patented Dec. 13, 1966

3,291,294
AUTOMATIC KNIFE BLOCK CONTROL MECHANISM FOR LINECASTING MACHINES
Frederick P. Netznik, Skokie, and Patrick J. McCauley, Glenview, Ill., assignors to Mohr Lino-Saw Company, Skokie, Ill., a corporation of Illinois
Filed May 28, 1965, Ser. No. 459,845
28 Claims. (Cl. 199—59)

The present invention relates to an improved automatic knife block control mechanism for linecasting machines. More particularly the invention is directed to a knife block control mechanism which is responsive to perforated tape control, although in its broader aspects this knife block control is not necessarily limited to perforated tape control.

The present invention has been developed as an improved extension of the automatic control system disclosed in the prior co-pending application of Frederick P. Netznik and Joseph Gardberg, Serial No. 407,200, filed October 28, 1964.

One of the objects of the invention is to provide an improved motor driven arrangement of setting screws for determining the knife position.

Another object of the invention is to provide an improved arrangement of spring means for shifting the adjustable knife into its adjusted or set position.

Another object is to provide an improved arrangement of power means for shifting the adjustable knife into position for the setting screws to be rotated to different positions when giving the adjustable knife a new setting.

A still further object is to provide improved circuitry and associated means for electrically adjusting the movable knife and securing it in desired adjustment.

Further objects and advantages of our invention will appear from the detail description.

In the drawings:

FIGURE 1 is an elevational side view of a knife block embodying our invention with certain parts broken away.

FIGURE 3 is a detail view of the knife block mounting bracket.

FIGURE 4 is an inner face view of the index plate and associated parts, with the indicating dial partly broken away and certain parts shown in section.

FIGURE 5 is a sectional view taken substantially on line 5—5 of FIGURE 4.

FIGURE 6 is a sectional view, on an enlarged scale, taken substantially on line 6—6 of FIGURE 5.

FIGURE 7 is a fragmentary sectional view taken substantially on line 7—7 of FIGURE 4.

FIGURES 12 to 17 inclusive set forth the control circuits for the knife block and mold disk equipment.

Figure 2:
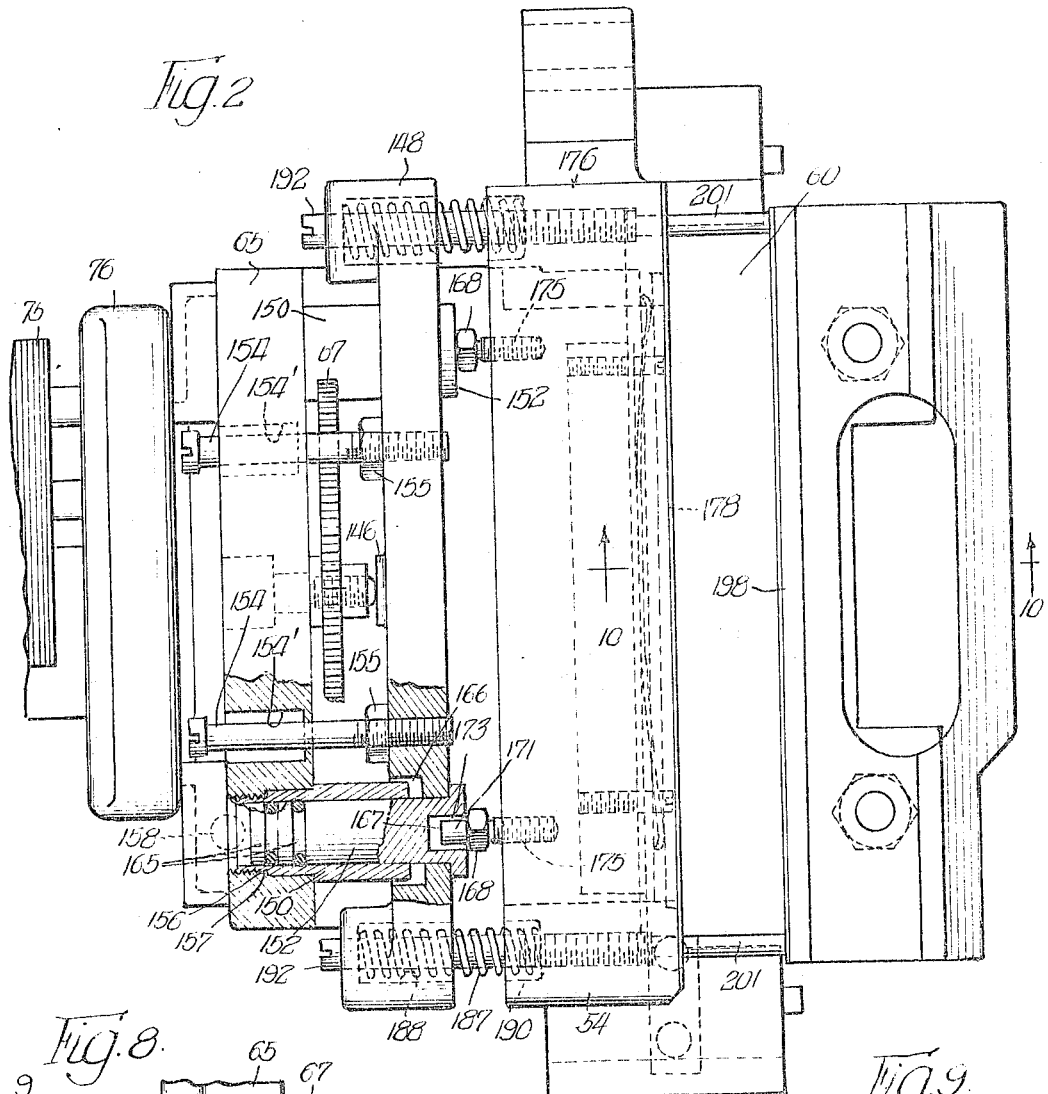
FIGURE 2 is an elevational view of the knife block of FIGURE 1, taken at a right angle to the latter figure and with certain parts broken away.

The various operative parts that actuate the adjustable knife blade are carried on a mounting body or bracket 50 which is in the form of a casting comprising a vertical bar portion 52 (FIGS. 2 and 3) having at one side upper and lower bolting pads 54 projecting laterally therefrom. Main fastening bolts 58 pass through these upper and lower pads and into mounting holes in the frame portion of the linecasting machine proper. The guideway through which the vertical slugs pass in the trimming operation is indicated at 60, and is defined generally at top and bottom by the bolting pads 54 and is defined along one side by the vertical bar portion 52. Projecting laterally from the opposite side of the vertical bar portion 52 of bracket 50 are upper and lower attachment lugs 62 receiving cap screws 64, which fasten an outer index plate 65 to the outer ends of these attachment lugs 62.

As shown in FIG. 4, the inner side of the index plate 65 has rotatably mounted thereon a rotary index disk or turret head 67 which carries a circular series of indexing screws 68 which determine the position of the adjustible knife blade. The manner in which these indexing screws determine the degree of opening of the adjustable knife will be later described. The toothed periphery 69 of the indexing disk 67 meshes with a drive gear 74 which is also rotatably mounted on the inner side of the index plate 65. This drive gear 74 is driven from an electric motor 75 (FIGURES 1 and 2) which is mounted on the opposite side of the index plate 65. This motor 75 may be of any conventional type represented, for example, by a small shaded pole alternating current motor. The rotor thereof is coupled through a speed reducing gear unit enclosed within a gear reduction housing 76, which is fastened to the outer side of the index plate 65 and functions as the motor supporting base. The motor speed may vary from say 1725 to 3300 r.p.m., and the speed of the output shaft 78 reduction gear unit is preferably in the neighborhood of 35 to 40 r.p.m.

Referring to FIG. 5, the output shaft 78 of the speed reducing unit in housing 76 extends back through the index plate 65 and has the inner driving gear 74 mounted thereon. The operative connection between the output shaft 78 and the hub portion 82 of the driving gear 74 is through a friction slippage clutch comprising two semicircular friction segments 84 (FIG. 6) which fit in an annular groove 86 formed in the shaft 78. The frictional grip exerted by these friction segments is made adjustable by four set screws 88 which screw into equally spaced holes in the hub 82 and exert distributed pressure on the two friction segments 84.

Mounted over the outer end of the shaft 78 and of the hub 82 is a manually rotatable indicating dial 90, the hub portion 92 of which is secured by set screw 94 to the outer end of the hub 82 of the drive gear 74. Referring to FIG. 4, it may be seen that one part of the periphery of this dial is formed with a knurled flange or rib 96 to facilitate manual rotation, and the other part of the periphery is formed with an adjoining cylindrical band or rim area 98 around which are applied a series of numerals 99. There are seven numerals around this numbered band width, designated 1 to 7 inclusive and distributed as follows. The numerals from 1 to 6 are all spaced by five equal length sectors; and the sixth sector from 6 to 1 is also of the same overall length as the other sectors, but this sixth sector is divided into two equal areas, and at the half way mark the numeral 7 is located. The angular relationship just described is best illustrated by the spacing shown between the index screws 68 having numerals 1, 7, 6 in FIGURE 4. The significance of this arrangement of the numerals is that the positions indicated by numerals 1 to 6 represent correspondingly different widths of the knife opening, and that the position indicated by numeral 7 represents the wide open position of the knife for accommodating overhanging type characters.

The outer peripheral portion of the dial 90 projects through a window or opening 102 (FIG. 5) in a front cover plate 104, so that the numerals 99 can easily be read, and the dial 90 can readily be adjusted by a person's finger pressing on the knurled rib 96 thereof.

Secured to the outer side of the drive gear 74 is a detent disk 106 having twelve equally spaced radial notches 108 therein. This detent disk is releasably secured to the drive gear 74 by clamping screws 110 which pass through arcuate adjustment slots 112 in the disk and thread into the drive gear 74. Loosening of the screws 110 permits rotation of the drive gear 74 and of the indexing disk or turret head 67, while the detent disk 106 is locked against rotation by a latch lever 114 engaged in one of the slots 108 of disk 106. The turret head 67 is then adjusted to such position that the shortest pin or screw thereof is accurately aligned on the horizontal center line of the knife block, in alignment with the button 146 of the knife carrier 148. That provides an accurate initial setting of the turret head 67, assuring accuracy in such other settings thereof as may be required. Upon completion of such initial setting, the screws 110 are tightened up effective for again securing detent disk 106 to the drive gear 74.

The disk 106 is normally locked in adjustment by the detent or latch lever 114 pivotally mounted on a pivot pin 116 carried in a mounting block 118 and engaged in one of the notches 108. The latching lever 114 is moved to release position by the energization of a solenoid 120 (FIGURES 1, 4 and 7). The solenoid 120 is mounted in a bracket structure 121 secured to plate 65. It has a core 122 which is pivotally connected to the lever at 124 and which is adapted to be drawn into the solenoid winding in opposition to the action of a compression spring 126. The spring 126 seats in a socket in plate 65 and extends through an opening in block 118, with its outer end seating against the inner edge of lever 114 outwardly of pivot pin 116. The spring 126 normally holds the latch lever 114 pressed down into one of the notches 108, or holds it pressed against the top of the detent disk 106 in readiness to be snapped into any notch which is moved to position under the latch lever. The inherent momentum of motor 75 will cause disk 106 to coast until a notch 108 reaches a position underlying the latch lever 114 at which time the latch lever 114 will snap into that notch. The friction clutch, comprising the segments 84, then permits the motor 75 to coast to a stop. Movement of latch lever 114 in latching direction preferably is limited by a stop 115, secured to plate 65 to prevent contact of latch lever 114 with gear 74.

The winding of solenoid 120 has connection with the same energizing circuit motor 75, so that whenever the motor is energized the detent or latch is also released from one of the notches, or is held in a released position. The latch will remain in this released position so long as the motor 75 is energized for rotating the drive gear 74, but as soon as the motor 75 is de-energized the solenoid will likewise be de-energized with the resulting movement of the latch lever back into one of the notches.

Provided adjacent the opening 102 is a manually operated indexing plunger 130 (FIG. 1) which can be actuated by any attending supervisor whenever it is desired to change the trimming position of the adjustable knife, as for accommodating a different size or style of type character, particularly when it is desired to make a manual change rather than an automatic tape controlled change. This plunger has knob 131 mounted on its outer end. The plunger 130 has a shank which passes under the latch lever 114 and comprises an outer relatively large portion 132 and an inner relatively small portion 133. These two shank portions are joined by a beveled shoulder 134. The plunger 130 has slidable mounting in upstanding end legs 135 of a mounting bracket 136, and a compression spring 137 is confined between the knob 133 and the adjacent end leg 135 of bracket 136. Outward movement of plunger 130 is limited by an abutment 139 thereon disposed to contact the outer leg 135 of bracket 136. The inner extremity of the shank portion 133 has a rounded end 138 for actuating button 141 of a switch 142 that is connected to energize a control valve of a hydraulic pump assembly, when this switch is closed. This causes hydraulic pressure to be transmitted to the knife block unit for shifting the adjustable knife blade to its substantially closed position, preparatory to rotating the turret head to a different knife setting, as will be presently described. In the normal retracted position of the plunger 130, the small diameter shank portion 133 lies under the latch lever 114, which permits this lever to have a position of latching engagement in one of the latching notches 108. Upon thrusting the plunger inwardly, the switch button 141 is first actuated for operating the hydraulic control valve and with continued inward movement of the plunger the beveled step 134 engages the underside of the latch lever 114 and rocks it outwardly into its latch releasing position. The operator is now in position to adjust the turret head 67 for setting the knife 178 for trimming slugs of the selected thickness, which he can then proceed to do by exerting finger pressure against the knurled rib 96 of the dial 90. Thereafter, upon release of the plunger 130, the latch lever 114 drops back into the nearest detent slot 108 and the hydraulic control valve closes to discontinue transmitting pressure, with the adjustable knife blade setting in its new manually adjusted position.

Referring further to the index disk 67 and to the series of indexing screws 68 carried thereby (FIGS. 4 and 8), these screws 68 are of various lengths, ranging from the longest screw down to the shortest screw, and each is threaded into a socket 144 projecting inwardly from the index disk, which socket enables each screw to be slightly adjusted in height for any individual adjusting purposes. These indexing screws are adapted to be rotated successively into registration with a hardened index button 146 that projects outwardly from the knife carrier 148 (FIGURE 2). From this it will be seen that this index button 146 defines the index zone into which the different indexing screws 1 to 7 must be moved to be effective for determining the position of the adjustable knife blade.

The knife blade carrier 148 comprises a vertical bar spaced inwardly of the index plate 65, and is mounted for rectilinear shifting movement toward and away from the latter. This rectilinear shifting movement of carrier 148 is effected and guided by upper and lower hydraulic cylinders and pistons 150 and 152 and is also guided by stop screws 154 which have their inner ends threaded into the carrier 148 and are slidable through corresponding openings in index plate 65, screws 154 being secured against rotation by lock nuts 155. The stop screws 154 are headed, as shown, and the heads enter pockets 154' in the index plate 65, effective for limiting travel of carrier 148 in knife closing direction, preferably to a minimum spacing of approximately .020″ between blades. As shown in FIG. 2, the hydraulic cylinders 150 have threaded ends 156 screwing into threaded bores 157 formed in the inner side of the index plate 65. These two cylinders are both connected with horizontal hydraulic passage ways 158 (FIGURES 1 and 2) drilled out in the upper and lower marginal portions of the index plate 65, these two passage ways being cross connected at one end by the vertical drilled passage way 160 (FIG. 1). The supply nipple 162, which connects with the flexible hydraulic line, can be connected to an end of any one of these drilled passage ways, the outer ends of the other drilled passage ways being closed by plugs 164.

The pistons 152 have O-rings 165 in their outer left hand ends, and have their inner ends seated in pockets 166 in the adjacent side of the knife blade carrier 148. Mounting screws 167, having polygonal heads 168, are threaded into the knife assembly 176. The screws 167 have terminal studs 171 disposed to enter countersunk sockets 173 in the ends of the pistons for accurately positioning the knife assembly, including the adjustable knife 178, relative to the knife carrier bar 148. The screws 167 also provide means for adjusting the adjustable knife blade 178 relative to carrier 148 so as to assure parallelism of blade 178 with blade 198 and resultant parallelism of the sides of the trimmed slugs. A conventional type of tension spring 181 is connected on a diagonal line between a sloping clip 183 fastened to the center of the carrier bar 148 and fastened at its other end to a sloping clip 185 fastened to the knife blade assembly 176. The provision of this diagonal tension spring is old and well known, and it serves to keep the studs 171 projected into the sockets 173.

The carrier bar 148 is urged toward the left (FIG. 2) in a knife opening direction by compression springs 187 confined between pockets 188 at the upper and lower ends of the carrier bar 148, and pockets 190 provided in the adjacent surfaces of the upper and lower bolting pads 54. These compression springs 187 are centered on guide bolts 192 which pass through the outer ends of the carrier bar 148 and which have threaded portions screwing into tapped holes in the pads 54. The outer or right hand portions of the bolts 192 are reduced in diameter and project a slight distance beyond knife 178 providing banking studs 201 contacting the stationary knife 198. That assures accurate positioning of the adjustable knife block relative to the stationary knife 198. In abutting the stationary knife 198, these banking studs 201 enable a "squared" relation to be established between the mounting body 50 and the stationary knife 198 in the installation of the mounting body 50. The studs 201 in addition to serving as banking studs for the adjustable knife block, also function to prevent contact between the blades, being so adjusted as to assure a space of approximately .020″ therebetween when the blade 178 has been moved to its maximum extent toward blade 198.

The knife assembly 176 carries the conventional spring plate 196 for holding the type slugs pressed laterally toward the stationary knife blade. The cast slugs are pushed from the mold and between the knives and through passage 60 and then are delivered to the galley, in the usual manner.

As will be understood from what has been said, the spacing of the adjustable knife from the stationary knife 198 is determined by the selected screw of the turret head 67 with which the button 146 of the knife carrier 148 is held in pressure contact by the compression springs 187. In that connection, the carrier 148 extends across an outer segment of the turret head 67 and is provided with two openings 200 (FIG. 1) disposed to receive the two setting screws of the turret head at opposite sides of and adjacent a shorter setting screw in contact with button 146.

Figure 8:
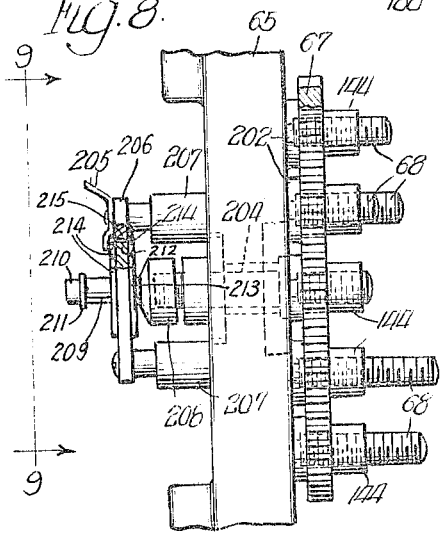
FIGURE 8 is a fragmentary side view of the index plate and the turret head and associated parts.
Figure 9:
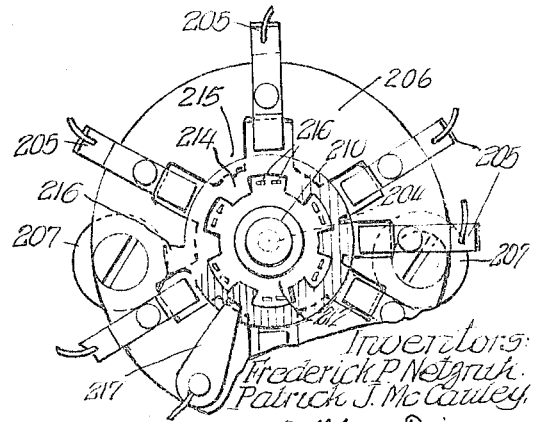
FIGURE 9 is a detail view, on an enlarged scale, taken substantially on line 9—9 of FIGURE 8.

Referring to FIGURE 8, each of the pins or screws of the turret head 67 has at its outer end a pad or button 202 which seats on the inner face of the knife carrier 148 and takes the thrust of the knife carrier 148 exerted by the compression springs 187.

The turret head 67 is fixed on the inner end of a stub shaft 204 rotatably mounted through index plate 65. A plurality of contact fingers 205 (seven in number) is mounted on a circular insulating member 206 concentric with the reduced outer end portion of shaft 204 (FIG. 8). The insulating member 206 is secured to insulating posts 207 secured to the outer face of plate 65. A cap member 208, having an outer reduced neck 209 with flatted sides, is secured by screw 210 and a spring washer 211, to shaft 204 for rotation therewith. An insulating disk 212 fits snugly about the neck 209 of cap 208 for rotation therewith. The disk 212 is provided with a relatively narrow brass ring 213, at its inner side and projecting radially outward beyond the disk. A similar ring 214 is secured to the outer face of disk 212 and projects radially therebeyond, providing with ring 213 an annular channel extending around disk 212. The insulating member 206 is provided with a plurality of teeth 215 projecting into the channel effective for restraining member 206 against axial movement. The rings 213 and 214 are secured to disk 212 in any suitable manner, conveniently by pointed elements thereof inserted through disk 212 with their exposed portions bent over onto the disk.

The outer brass ring 214 is provided with an outwardly extending wiper element 216. The insulating member 206 also has secured thereto a wiper 217 which contacts the brass ring 214 and to which a lead is connected, it being understood that appropriate leads are also connected to the contact fingers. As will be understood, the contacts and associated parts above described have to do with the circuiting and associated elements for effecting automatic adjustment of the adjustable trimming knife, previously mentioned and which will be described presently.

Figure 10:
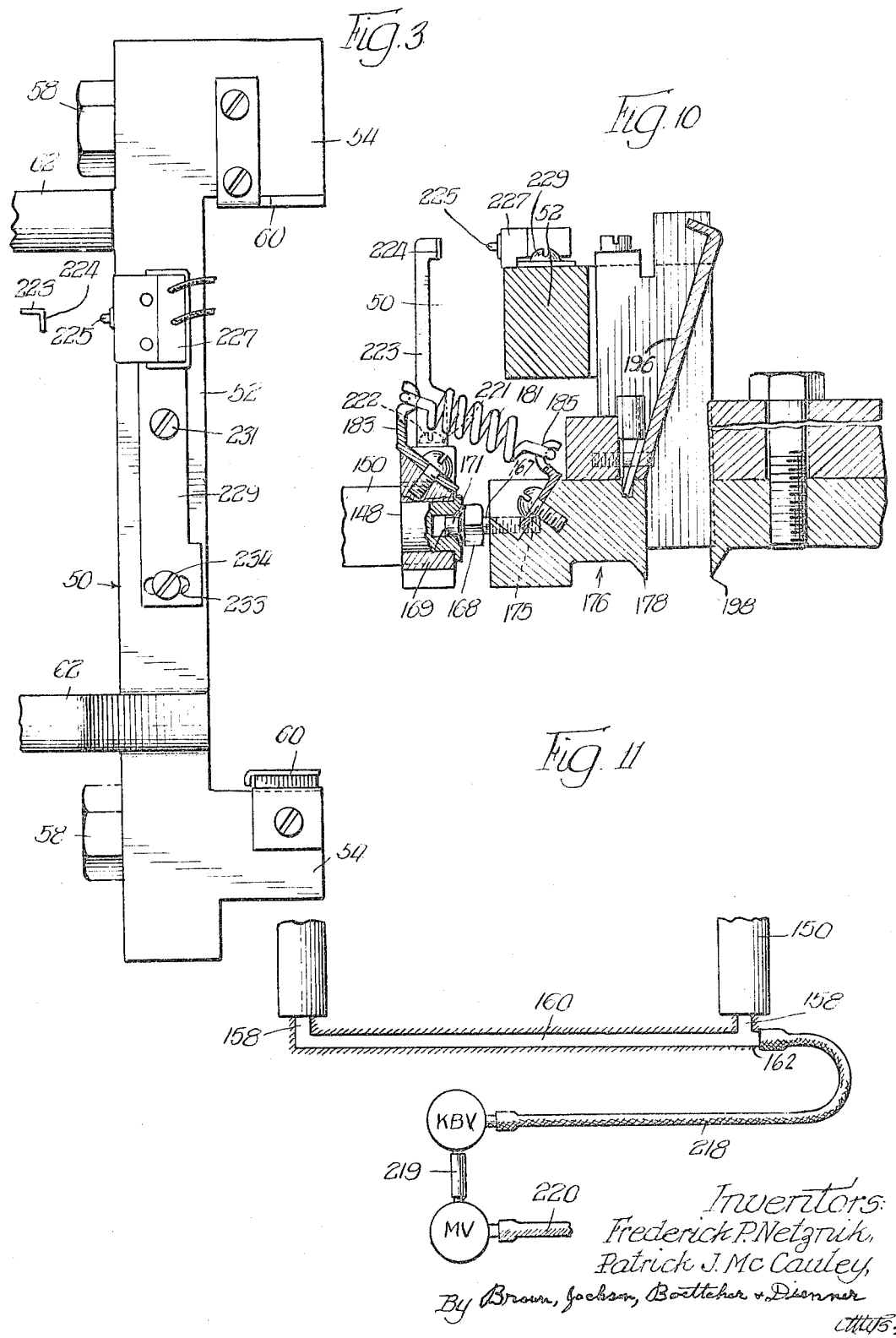
FIGURE 10 is a fragmentary sectional view taken substantially on line 10—10 of FIGURE 2, parts being shown in elevation.

Referring to FIGURES 3 and 10, a bracket base 221 is secured by screws 222 to the inner face of the knife carrier 148, and bent at right angles thereto is a bracket arm 223 having a switch actuating lip 224 at the end thereof. This lip is arranged to depress the plunger 225 of a small hydraulic control switch 227 mounted on the inner or left hand side surface of the vertical bar portion 52 of bracket 50. The arm 223 and its lip 224 are operative to depress the switch plunger 225 when the knife carrier 148 is moved into the substantially closed position of the adjustable knife, this being caused by the outward extension of the hydraulic cylinders 150 under hydraulic pressure. The switch housing 227 is mounted for adjusting movement toward and away from the arm 223 and lip 224 to control the timing of the switch with respect to the movement of the knife. This adjustable mounting is in the form of a lever 229 pivoted at 231 to the side of the bar portion 52 and carrying the switch housing at one end. The other end of the lever 229 has an adjusting slot 233 through which passes a clamping screw 234 threading into the bar portion 52. Upon releasing the clamping screw, the lever 229 can be swung by virtue of the slot 233, to swing the switch housing and the plunger 225 toward or away from the switch actuating arm 223, whereby to control the positioning of the switch with respect to the closed position of the adjustable knife. This switch controls the hydraulic pressure to the hydraulic cylinders, as will be later described in connection with the electrical circuitry.

Figure 11:
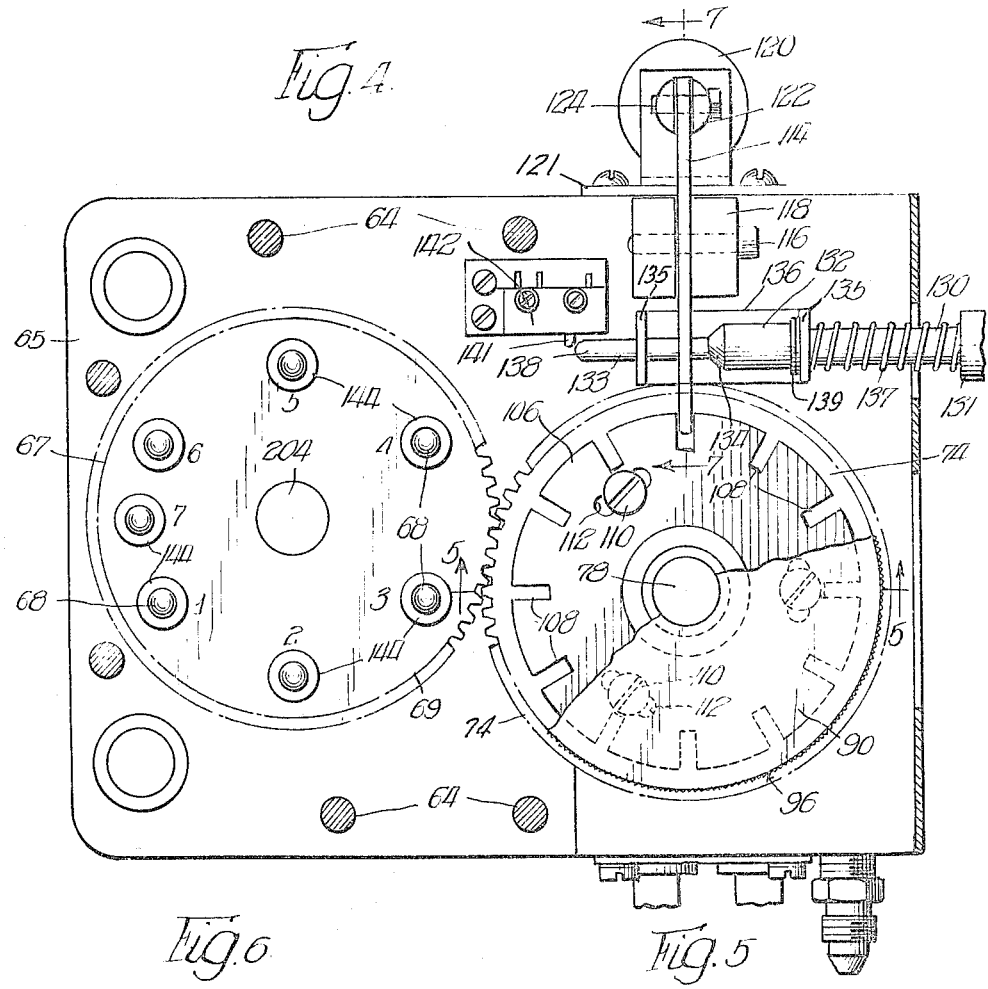
FIGURE 11 is a diagrammatic view of the hydraulic cylinders of the knife block and associated connections and valves.

Referring to FIGURE 11, the knife block hydraulic cylinders 150 are shown as connected by passageways 158 to a passageway 160 in one end of which a nipple 162 is secured. Nipple 162 is connected by a length of flexible hose 218 to a solenoid knife block valve KBV. The latter valve is connected by a length of hose 219 to a master valve MV which is connected by a hose line 220 to a suitable source of hydraulic pressure. The functioning of the valves KBV and MV will be described more fully in connection with the electrical control system above referred to.

*Electronic control circuitry for knife block and mold disc*

The operation of an automatic linecasting machine which includes control means for effecting the automatic positioning of a saw, the automatic positioning of an adjustable knife relative to the stationary knife, the automatic positioning of the mold disc, and the automatic selection of the magazine is first briefly set forth as an aid to an understanding of the invention.

Figure 17:
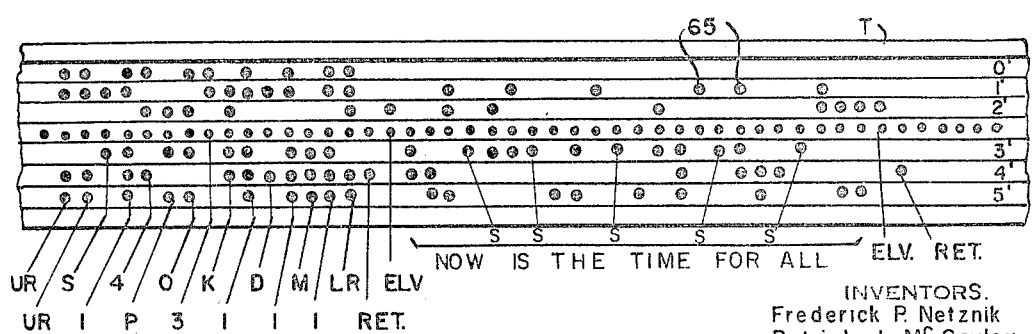

The operation of an automatic linecasting machine of such type is described in detail in the copending application, Serial No. 407,200, which was filed on October 28, 1964 by Frederick P. Netzink and Joseph Gardberg and assigned to the assignee of this invention. By way of brief outline, in its normal operation a tape member T (a small segment of which is shown in FIGURE 17) is fed to a conventional tape reader TR on the linecasting machine which senses the codes on the tape, and provides signals representative thereof. The tape in the disclosed system has six longitudinal rows or levels which are punched in different bit combinations up to six and disposed tranversely in six different levels on the tape member. As the tape T is advanced intermittently, step by step, through the tape reader TR, and as each transverse line of single perforations enters the sensing zone of the reader, sensing fingers or plungers determine the presence of the perforations and the tape level in which they occur, and a set of contact fingers CS0–CS6 operate in accordance therewith.

With reference to FIGURE 17, the first set of coded signals on the tape T shown thereat are used to control the machine in the production of a slug (i.e., LR, RET now . . . all). As the coded signals there shown are sensed by the sensing fingers CS0–CS5, the equipment is operative to assemble the indicated line in the assembling elevator in known linecasting machine operation. Briefly, as each code signal is sensed, the six code bars operate to select the character indicated, and the selected code bars are thereafter triggered by a mechanical action to drop the desired character from the linecasting machine magazine to the assembling elevator.

As the tape advances to effect the selection of the successive characters (not shown), the line is assembled in known manner. After the line is assembled, the elevate signal on the tape is read out, and in normal operation, the line is delivered to the assembling elevator, and thence to the delivery slide for the full cycle of casting, trimming and sawing to length.

However, in the event that a set of function control signals precedes the next line on the tape (i.e., a request for a change of slug length which requires resetting of the saw position occurs before the next line) the cycle for the next line (i.e., "n," "o," "w," etc.) will occur only after the requested functional controls have been effected.

As shown in the exemplary type of FIGURE 17, the functional control signals there illustrated comprise a pair of upper rail signals UR, UR, a saw positioning signal S followed by two digits "1" and "4" which indicate the pica position desired for the saw, a spacer letter P followed by two digits "0" and "3" indicating the point position of the desired saw setting, the letter K and the digit "1" indicating that the knife block is to be adjusted to position 1, the letter D followed by the number "1" indicating that the mold disc is to be adjusted to the position 1, the letter M followed by digit 1 indicating the magazines are to be adjusted to combination or condition 1, the signal LR which constitutes a lower rail signal, the signal RET which constitutes a return signal, and the signal EL which constitutes the elevate signal.

The control circuitry is responsive to the receipt of two upper rail signals UR, UR to automatically effect blocking of the equipment from normal typesetting response, and thereafter in response to the signals S14P03 is operative to effect adjustment of the saw to the 14 pica 03 point position as set forth in detail in the above identified copending application. Briefly, as the tape advances to effect readout of the two upper rail signals UR, UR, a selector mechanism in the system controls a blocking bar to move from its normal typesetting position to its control or type blocking position. The blocking bar remains in such position during the readout of the subsequent signals on the perforated tape with the exception of the lower rail signal and of the elevate signal so that the typesetting equipment will not respond to the coded information which appears on the tape after the letters UR, UR. After the code UR, UR has shifted the equipment to the command position, and the letter S has been registered on the code switches CS0–CS5 (FIGURE 12), a bit switch operates to read the letter S as marked on the code switches CS0–CS5 into a matrix M.

The matrix M may be of a conventional structure in which markings on the input conductors M0–M5 in a six unit binary code are translated into markings on digit conductors N1–N0 to indicate the receipt of digits 1–0 (the upper edge of matrix M) and markings on the horizontal conductors 0, $\bar{0}$ . . . 5, $\bar{5}$ to indicate the detection of letters D, K, M, P and S (the right hand side of matrix M). A specific matrix which is so operative is disclosed in detail in the copending application.

With readout of the letter S by the code switch CS0–CS5 the matrix M marks conductor S with a negative potential signal and the saw positioning circuitry SPC is prepared in response thereto to respond to the further signals which relate to the desired saw position. Thus, as the pica digit (14), spacer character (P), and point digits (03) are received by the matrix M, the digit conductors DC and character conductor P on the saw position circuitry SPC are energized accordingly.

The saw positioning circuit SPC operates a 4R relay (not shown) which opens the energizing circuit for the elevate circuitry (FIGURE 14) and operates the saw position motor to set the saw to the point and pica position which has been requested. After such setting has been accomplished, the saw position circuitry SPC terminates the saw position adjustment, and sends a signal to indicate to the circuitry that the desired positioning of the saw has been accomplished. At such time the 4R relay restores to recomplete a part of the elevate circuitry. However, as will be shown, the elevate solenoid ES will only operate after the tape has been advanced to effect readout of the elevate signal which appears at the end of the command information.

Additionally, as will be disclosed herein, novel control circuitry is also operative (a) in response to the code K1 signals on the tape T to adjust the knife block to the first position of seven predetermined positions, (b) in response to code D1 signals on the tape T to adjust the mold disc to the first position of six available mold positions, and (c) in response to code signals M1 to adjust the magazines to the first of four possible operating conditions.

Briefly, as the tape T advances, and the knife block, mold disc, and magazine code signals K1, D1 and M1 respectively are successively sensed by contacts CS0–CS5, (FIG. 12) and fed into matrix M, the matrix horizontal output conductors 0, $\bar{0}$ . . . 5, $\bar{5}$ are marked to energize, in sequence, the conductor K, N1; D, N1; and M, N1.

By way of specific example, with the sensing of the code signals for character "K" by contacts CS0–CS5, horizontal output conductors, $\bar{0}$, 1, 2, 3, 4, and $\bar{5}$ are marked, and a negative potential signal is tranmsitted over conductor K to the knife block control circuit KB (FIGURE 13) to indicate that a knife block setting is required. With sensing of the digit immediately subsequent to the letter K (digit 1 in the present example), matrix M marks conductor N1 with a negative potential signal which is transmitted to an input circuit for latching circuit or register 561 in knife block control circuit KB, and an input circuit for latching or register circuit 661 in mold disc contol circuit D, and input for the magazine control. As will be shown, only the latching circuit 561 associated with the knife block control circuit is enabled to register the digit 1 at this time.

In a similar manner, as the tape advances and contacts CS0–CS5 effect readout of the signals for character "D" the horizontal output conductors $\bar{0}$, 1, $\bar{2}$, $\bar{3}$, 4, $\bar{5}$, are marked in matrix M, and a negative signal is extended over conductor "D" to the mold disc control circuit MD (FIG. 15) to indicate a request is being received for a mold disc position adjustment. As the digit occurring after the letter D (digit 1 in the present example) is read out, conductor N1 of matrix M is marked to the inputs of latching circuit 561, latching circuit 661 and magazine control input 1. However, since conductor D is marked, only the mold disc control circuitry MD will register the request for movement of the mold disc to position 1.

As the tape advances, and contacts CS0–CS5 sense the signals for the character M, matrix M marks output conductors 0̄, 1̄, 2̄, 3, 4, 5 and conductor "M" which extends to the magazine control circuitry is energized. As the digit on the tape immediately after the signal "M" on the tape is sensed by fingers CS0–CS5 (digit 1 in the present example) the conductor N1 is marked and a signal is transmitted to an input circuit for latching circuit 561, latching circuit 661 and magazine control input 1. Since the magazine control conductor M is marked, only the magazine control circuit MG will mark its registers to indicate the magazines are to be operated to condition 1.

As the elevate signal EL at the end of the command signals is received, the elevate switch is closed and the machine runs through a dry cycle during which the knife block control circuitry (KB—FIG. 13) effects adjustment of the knife to the position indicated by the digit registered.

After the dry cycle is completed, and as the knife has been adjusted to the desired position (or if the knife was in such position), the knife block control circuitry KB transmits a signal over sequencing conductor 568 to the mold disc cotnrol circuitry MD which responsively effects adjustment of the mold disc to the position indicated by mold disc position digit on the register circuits 661–666 (digit 1 in the present example). If a change of position is required, the mold disc control circuitry MD moves the mold disc to the requested position. If the mold disc is in the requested position, or at such time as the requested position is reached, the mold disc control circuitry MD will enable the magazine control circuitry MG to effect a major shift, if such shift has been requested.

Digressing briefly, shifting of the four magazines each of which carries a different set of matrices, are divided into major shifts and minor shifts. That is, in the first position, magazines 1 and 2 will be arranged for selective use in a typesetting operation, and in a second position the magazines 3 and 4 are arranged for selective use in a typesetting operation. If magazines 1 and 2 are in position, and it is necessary to bring the magazines 3 and 4 into position such shift of the two pairs of magazines is identified as a major shift, and can be effected only after the knife and mold disc settings have been satisfied.

However, in the event that the magazines 1 and 2 are in position for use, and the request is for magazine 1, such shift is identified as a minor shift, and such shift can be made immediately at the time of the readout of the magazine information into the magazine control circuitry MG. That is, the minor shift will be made without waiting for a signal from the mold disc circuitry MD indicating that the knife block and mold disc have been set to the requested positions.

*Knife block control circuitry KB*

The knife block control circuitry KB is shown in detail in FIGURES 13, 14. As there shown, the knife block control circuitry KB includes seven marking or latching circuits 561–567, each of which is connected to register a different one of the seven marking signals which are provided over conductor N1–N7 by matrix M to request the seven different positions of the knife block. In marking of the matrix conductor N1, for example, to request movement of the knife block to position 1, a marking signal is provided for the first latching circuit 561; with the marking of the matrix conductor N2, a marking signal is transmitted to the input circuit for the second latching circuit 562, etc.

Each latching circuit, such as 561, basically includes three switches, such as 570, 580, 583, which operate, and hold, to register the receipt of a signal over its associated input conductors, such N1, whenever the signal is for the knife block control circuitry KB. Function prepare relay 585 which is connected common to the latching circuit is operated whenever a signal is registered on one of the latching circuits 561–567. The switches, such as 580, 583 for latching circuit, such as 561, maintain such registration (and function prepare relay 585 operated) until reset by a signal over an associated reset conductor, such as reset conductor MK1 for latching circuit 561.

As noted above, the matrix conductors N1–N6 are also connected to latching circuits in the mold disc control circuit MD and the conductors N1–N4 are connected to the magazine control circuitry MG, but such signals are without effect at this time since only the latching circuits 561–567 in the knife block control circuit KB have been prepared to respond thereto.

A selector circuit SC which enables the latching circuits 561–567 to respond in such selective manner includes flip-flop circuit 505, 510 which is connected to the matrix conductor K. As will be shown, selector circuit SC enables the associated latching circuits 561–567 for operation by the signals on matrix conductors N1–N7 only when conductor K is marked to indicate a knife adjustment is desired. A switch 515 connected to matrix conductor NO provides a brief delay, during which the latching circuits 561–567 may respond to input signals on conductor N1–N7, and thereafter resets the flip-flop 505, 510.

The knife block control circuitry KB also includes a transistor switching pair 525, 530 which "hold" the circuit marked as prepared for operation until the dry cycle is completed.

A control relay 540 and switching pair 525, 530 control (a) a pot pump inhibit circuit to prevent casting of a slug, and (b) a slave relay 531 to complete an energizing circuit for the hydraulic system master valve and also the knife block hydraulic valve. As will be shown, the knife block valve moves the knife assembly away from the effective index pin or stop to permit adjustment of the head to move the pin into position which sets the knife at the desired position.

The control relay 540 is controlled by a cycle relay 554 (contacts 555) and an inhibit relay 558 (contacts 559). As will be shown, if the equipment is in cycle when the command for a knife adjustment is received, the cycle relay 554 will enable the control relay 540 after the cycle is completed. If the machine is not in cycle, the inhibit relay 558, which is operated as the elevate signal ES following the command information is received, enables the control relay 540. A function prepare relay 585 along with microswitch 591 (FIGURE 14) also controls the energizing circuit for the head motor 75 which in turn adjusts the turret head mounting the index pins to the desired position. A solenoid 120 disengages a positioning detent pin to permit movement of the turret head.

A position marking switch PMS synchronized in its movements with the head motor 75 marks the different indicator circuits KB1–KB7 as different pins are moved into position to provide different positions for the knife. As the head moves the desired pin into position, a marking signal from position marking switch PMS resets the energized one of the latching circuits (561 in the present example).

A reset switch 550 is connected to reset the switching pair 525, 530 after the dry cycle is complete. The cycle relay 554 also extends an enabling signal from capacitor 537 over conductor 568 as the cycle and knife adjustment has been completed.

*Specific description of knife block control circuitry KB*

With reference to FIGURE 13, marking conductors N1–N7 and conductor K are connected from the matrix M to separate inputs from knife block circuitry KB. With sensing of the letter K (positions 1, 2, 3, 4 on the tape T—FIG. 17) by contacts CS0–CS5, matrix M is energized to provide a marking signal over conductor K to one input of the selector circuit SC in control circuit KB, and with readout of the digit 1, matrix M marks conductor N1 to provide an energizing signal to the input circuit for the first latching circuit 561. With readout of the digit 1 an energizing signal is also provided over conductor N0 to the reset circuit 515 for the flip-flop circuit 505, 510.

Figure 12:
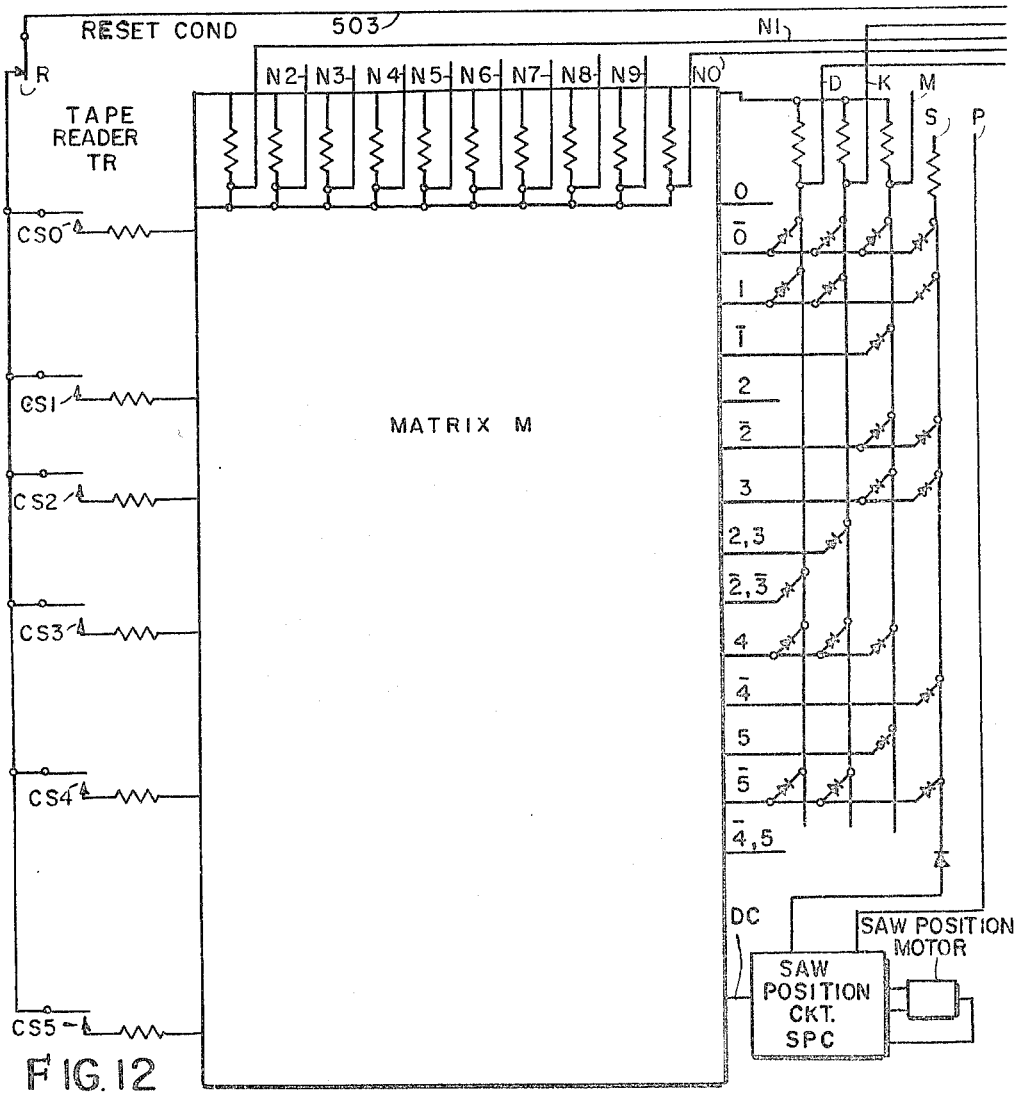

Selector circuit SC is also connected to the system reset conductor 503 (FIG. 12). As noted in the copending application contacts R are normally closed and positive potential (+55 v.) is normally extended over the reset conductor 503 by the control circuitry whereby operation of the selector circuit SC is normally inhibited. Immediately after the receipt of the signals UR, UR and the blocking of the typesetting unit in response thereto reset contacts R are opened, and positive potential is removed from the reset conductor 503 to permit response by the selector circuit SC to any signals received over the K conductor input circuit from matrix M.

More specifically, the selection circuit SC for the knife block control circuit KB basically comprises a flip-flop circuit including transistors 505, 510. Transistor 505 may be of the type commercially available as a 2N1302 which includes a collector element connected over resistor 512 to +15 volt potential and over resistor 513 to the base of transistor 510, an emitter element connected to zero volt potential; and a base element connected to the junction of resistors 502, 506 in the voltage divider including resistors 502, 506, 507 which is connected between +15 volts and −5 volts potential. The base of transistor 505 is further connected over resistor 503′ to the system reset conductor 503, and over resistor 501 to the K marking conductor which extends from matrix M.

Transistor 510 may be of the type commercially available as a 2N1302 which includes an emitter element connected common with the emitter of transistor 505 to zero potential, a base element which is connected to the junction of resistors 513, 514 in the voltage divider 512, 513, 514 and a collector element connected over resistor 507 to +15 volt potential, and over resistor 506 to the base of transistor 505.

With the system in the reset condition, +55 volt potential normally applied over the reset conductor 503 and resistor 503′ to the base element of transistor 505, the transistor 505 is normally turned on, and the zero potential which occurs at the collector thereof provides a negative potential to the base of transistor 510 which is turned off. As a result the potential on conductor 524 goes more positive to cut off the input circuits to each of the latching circuits 561, 567 for response to signals received over the matrix marking conductors N1-N7.

The base element of transistor 510 in the selector circuit SC is also connected to the emitter element of transistor 515 which further includes a collector element connected to the −5 volt potential, and a base element connected over capacitor 517 to zero volt potential, and over resistor 516 to matrix conductor N0. As will be shown, the flip-flop is set as the "K" signal is received over resistor 501, and a measured period after receipt of the signal on matrix conductor O, which period is fundamentally determined by the value of capacitor 517, the flip-flop shifts back to its original state (transistor 505 on and transistor 510 off).

The collector element of transistor 505 is further connected over resistor 518 to the base element of transistor 530 in the switching pair 525, 530 which may be of the type commercially available as 2N1303 and 2N1302 respectively. The base element of transistor 530 is further connected (a) over resistor 519 to −5 volt potential, (b) over resistor 551 to the collector circuit of transistor 550, and (c) over resistor 520 and diode 521 to the collector output of transistor 525. The emitter element of transistor 530 is connected to zero volt potential, and the collector element of transistor 530 is connected over resistors 522 and 523 to the +20 volt potential. In the reset condition of the flip-flop circuit (transistor 505 on) the zero potential which occurs at the collector of transistor 505 results in a more negative potential at the base of transistor 530 to maintain the same turned off.

Transistor 525 of the switching pair 525, 530 includes an emitter element connected to +15 volt potential, a base element connected to the junction of resistor 523, 522 (and thereby the collector output of transistor 530) and a collector element connected over resistor 526 to zero volt potential and also over diode 521 and 520 to the base of transistor 530. With the selector circuit SC in the reset condition and transistor 530 turned off, the positive voltage which appears at the base of transistor 525 maintains transistor 525 turned off.

The collector element of transistor 525 is also connected to control energization of the knife block control relay 540, which circuit extends over cycle relay contacts 555, inhibit relay contacts 559 and the winding of relay 540 to zero volt potential. The cycle relay CR is energized whenever the linecasting machine is in the normal (not cycling position and is restored only responsive to operation of the linecasting machine "off-normal," i.e., to initiate a cycle of the machine equipment.

Relay 540 includes a contact set 541 which provides a self-holding circuit for the relay 540, and further prepares a delayed enabling circuit for the mold disc control circuit MD. That is, contacts 541 prepare a charging circuit for capacitor 537 which extends from +15 volt potential over transistor 525, contacts 541, 556, capacitor 537 and over resistor 536 to −5 volt potential. The discharge circuit for capacitor 537 which is completed after the knife block adjustment is completed, extends from capacitor 537 over contacts 557, resistors 546 and 545 to −5 volt potential.

Transistor 550 which controls reset of the switching pair 525, 530 includes a base element connected to the junction of resistors 545, 546 in the discharge circuit, and further includes an emitter element connected to zero volt potential, and a collector element connected over resistor 552 to −15 volt potential, and over resistor 551 to the base of transistor 530. Transistor 550 is normally conductive, i.e., except for such period as the discharge circuit is enabled. During the discharge period, the transistor 550 is turned off, and the resultant negative signal which appears at the collector of transistor 550 is also applied to the base 530 to effect turn-off of the switching pair 525, 530.

A knife block control relay 540 further includes a set of contacts 542 which control an obvious energizing circuit for slave relay 531, and contacts 544 control a point in the energizing circuit for the pot pump inhibit circuit. Slave relay 531 has a first set of contacts 532, which control a point in the energizing circuits for the knife block valve 534 (FIG. 14), and a second contact set 533 which controls the master valve for the hydraulic system.

With reference once more to the flip-flop circuit 505, 510 which sets to initiate a knife block adjustment responsive to marking of the K conductor, it is noted that the collector element of transistor 510 is also connected to conductor 524. Since transistor 510 is normally turned off, the conductor 524 which is connected over resistor 507 to +15 volt potential is normally at +13.5 volts. When the flip-flop sets (transistor 510 conducting) zero volt potential is connected to conductor 524.

Conductor 524 is connected over resistor 572 to the input circuit for the latching circuit 561, and over similar resistors (not shown) to the input circuits for each of the latching circuits 562–567. With transistor 510 turned off, the positive 15 volt potential on conductor 524 over resistor 572 to the input circuit of each of the latching circuits 561–567 prevents response of such circuits to any signals which are coupled over the associated matrix conductors N1-N7.

As noted above, each latching circuit, such as 561, includes an input circuit including transistor 570 and a pair of switching transistors 580, 583. Transistor 570 may be of the type commercially available as a 2N1303 which includes a base connected over resistor 571 to the associated one of the matrix conductors (latching circuit 501 is connected to conductor N1, latching circuit 562 is connected to matrix conductor N2, etc.) and also over resistor 572 to the output of transistor 510 in flip-flop 505, 510. Each transistor, such as 570, further includes a collector connected to −15 volt potential, and an emitter element connected over resistor 573 to +5 volt potential. The emitter element of transistor 570 is also connected over resistor 574 to the input circuit for transistor 580. In the absence of an enabling signal from flip-flop circuit 505, 510, transistor 570 is turned on and a positive signal is extended over resistor 574 to the base element of the switching transistor 580 to maintain same turned off.

Transistor 580 may be of the type commercially available as a 2N1303 which includes an emitter element connected to zero volt potential, a collector element connected over resistors 582, and 581 to −20 volts. The second transistor 583 of the pair is controlled by transistor 580 and may be of the type commercially available as 2N1302. Transistor 583 includes a base element connected to the junction of resistors 581–582 (and the output of transistor 580), an emitter element connected to −15 volt potential, and a collector connected over resistor 584 and the winding of function start relay 585 to +15 volt potential.

Capacitor 588 is connected across transistor 583 and resistor 583′ to filter out any possible transients which might tend to cause a malfunction of transistor 583. In the absence of an enabling signal from flip-flop 505, 510 and the emitter follower 570 turned on, transistor 580 is turned off and the negative potential in the collector of transistor 580 appears at the base of transistor 583 to maintain same turned off. As a result function prepare relay 585 is normally in the restored position.

The collector element of transistor 583 is also connected over resistor 583′, a diode 578 and resistor 577 to provide a holding circuit for transistor 580 whenever transistors 580, 583 are turned on, as will be shown.

Each of the other latching circuits 562–567 are of the same structure as latching circuit 561, the outputs of each of the different latching circuits 562′–567 being connected common with the output of latching circuit 561 to the function prepare relay 585.

Function prepare relay 585 includes a first set of contacts 586 for completing a circuit to the head motor 75 and solenoid 120 whenever microswitch 591 (FIG. 14) is closed by the operation of the knife block valve 534 and a set of contacts 587 for energizing the inhibit relay 1NR while the knife setting is being effected. As will be shown, the inhibit relay 1NR is operative, as energized, to inhibit advance of the tape.

Motor 75 as noted above is connected to adjust the turret head to different positions, and wiper 217 of position marking switch member 595 is mechanically driven over contacts 205 by shaft 204 and motor 75 to mark position indicating conductors MK1–MK7 as the turret head is moved to select the different positions for the knife.

Each contact of the group 205 is connected over an associated position indicating conductor, such as MK1, to an associated indicator circuit, such as KB1, and an associated latching circuit reset conductor, such as conductor 569 for latching circuit 561. Each reset lead, such as 569, is connected to the switching pair, such as 580, 583, of its associated latching circuit such as 561 to control same to turn off as the motor 75 advances the head to the knife position represented thereby.

Indicator circuit KB1 (FIG. 14) includes a transistor 589 which is energized by a signal on conductor MK1 to complete an energizing circuit for lamp 599. The manner in which the circuitry is operative to adjust the turret head and thereby the knife in response to detection of a signal on the tape T is now set forth.

*Operation of knife block control circuit KB*

In the absence of a signal input to the knife block circuit (i.e., with the machine in the normal line-casting condition) reset contacts R (FIG. 12) are closed, and positive 55 volt potential is extended over the reset conductor 503, 503′ to the base of transistor 505 which is therefore turned on, and the resultant zero voltage which occurs at the collector of transistor 505 causes negative potential to occur at the base of transistor 510 which turns off. Flip-flop 505, 510 is therefore in the reset condition. The zero signal which occurs at the collector of transistor 505 causes negative potential to occur at the base of transistor 530 which is turned off. The resultant positive voltage which occurs at the collector of transistor 530 also appears at the base of transistor 525 and transistor 525 is turned off. As a result, in the absence of a signal input to knife block circuit the energizing circuit for control relay 540 is interrupted by transistor 525. Additionally, assuming the linecasting equipment is not cycling, cycle relay 554 will be energized, and the energizing circuit for control relay 540 is partially completed by closed contacts 555.

With flip-flop 505, 510 reset and control relay 540 restored, the head positioning motor 593 (FIG. 14) and solenoid 594 will be inoperative. Since transistor 510 is turned off, positive 15 volt potential exists on conductor 524 to provide an inhibiting voltage over a resistor such as 572 to the base element of the emitter follower, such as 570, in each of the latching circuits 561–567. As a result, any signals applied to the latching circuits 561–567 by matrix conductors N1–N7 during such period will be without effect.

It is assumed now that the tape advances to move the command signals shown in FIGURE 17 successively into readout position. As described in the copending application, as the characters UR, UR are sensed by contacts CS0–CS5 the linesetting equipment is blocked, and the subsequent information on the tape is translated as command information (rather than linesetting information), which conditions exists until the signals LR are once more detected. As the saw positioner signals S14P03 are sensed, and applied to matrix M, the saw position circuitry SPC controls the same position motor to adjust the same motor to the position "14 pica, 3 points." During such period relay 4R (not shown) in the saw positioning circuit interrupts a point in the energizing circuit to the elevate relay ER (FIG. 14), and the elevate solenoid ERS to prevent the operation thereof.

The tape T will continue to advance during the saw positioning operation, and accordingly the subsequent signals K1, D1, M1, LR, etc., are sensed in order.

As the character K is marked on the matrix M by contacts CS0–CS5, a negative eight volt signal will be extended over matrix conductor K to the knife block selector circuit SC, and immediately thereafter as the digit 1 is read out by contacts CS0–CS5, a negative signal is transmitted over the matrix conductor N1 to the input for latching circuit 561 and over the matrix conductor N0 to the reset input "O." The response of the circuit to such signals will now be described.

*Marking of request for knife control*

As the negative eight volt signal is applied to the conductor K by matrix M, transistor 505 is turned off, and the resultant positive voltage potential at the collector thereof is applied to the base of transistor 510, which turns on to connect zero volt potential to the conductor 524, and thereby remove the inhibiting voltage for the inputs of the latching circuits 561–567 which are connected to matrix conductor N1–N7 respectively.

As transistor 505 turns off, the resultant increase in positive potential which appears at the collector thereof, is also extended to the base of transistor 530, which turns on.

As transistor 530 turns on the resulting zero voltage at the collector thereof is applied to the base of transistor 525, which turns on to prepare the energizing circuit for control relay 540. Such circuit is presently interrupted, however, by the open contacts 559 of inhibit relay 558. Transistor 525 also extends +15 volt potential over diode 521 and resistor 520 to the base of transistor 530 to hold same turned on after flip-flop 505, 510 restores.

In that the inhibit signal on input conductors for latching circuits 561–567 has been removed by the selector circuit SC in response to receipt of the character K, transistor 570 will operate as an emitter follower for signals input thereto on conductor N1. As the matrix now extends negative eight volt potential over path conductor N1 and resistor 571 to the base of transistor 570, the signal is further extended by transistor 570 to the base of transistor 580 in the latching circuit. Transistor 580 turns on, and the resultant positive signal at the collector thereof appears at the base of transistor 583, which turns on to complete an operating circuit for the function prepare relay 585. Such circuit extends from +15 volt potential over the winding of function prepare relay 585, resistor 584, and transistor 583 to —15 volt potential. Simultaneously, the transistor 583 completes a hold circuit for transistor 580 to maintain the switching pair 580, 583 turned on subsequent to removal of the input signal on conductor N1. The holding circuit extends from —15 volt potential over transistor 583, resistor 483′, diode 578 and resistor 577 to the base of transistor 580.

Function prepare relay 585 operates, and at its contacts 586 prepares the energizing circuit for head adjustment motor 593 and solenoid 594 (which are presently held inoperative by the open microswitch contacts 591) and at contacts 587 prepares an energizing circuit for inhibit relay 1NR.

At this point it is noted that the values of the resistors 584, 584a–584f have been selected with reference to the value of the winding of relay 585, and as relay 585 operates, the end of the winding connected to conductor 524 drops to approximately +3 volts. With conductor 524 at +3 volts, the remaining circuits 562–567 cannot latch.

At the same time that the conductor N1 was marked by matrix M, a similar signal was transmitted over matrix conductor 0 (i.e., any time one of the digit conductors N1–N9 is energized, the matrix conductor N0 is also energized), and transistor 515 which is normally off, is turned on, whereby a —5 volt signal is coupled to the base of transistor 510 to turn transistor 510 off, and the resulting positive voltage which occurs at the collector thereof also appears at the base of transistor 505 to cause same to turn on, whereby flip-flop 505, 510 is reset.

The positive-going signal which now appears at the collector of transistor 510 is extended over conductor 524, and resistors, such as 572, in the input circuit of each of the latching circuits 561–567, whereby any further signals which appear on matrix conductors N1–N7 during the period in which the knife block control circuit KB is in the marked condition will be ineffective to register information on the latching circuits 561–567. Capacitor 517 associated with the transistor 515 and 518 provides a time delay in addition to the time between operation and reset of the flip-flop which is of sufficient interval to permit the signal which is marked on the selected one of the matrix conductors N1–N7 to be effective.

At this time, therefore, flip-flop 505, 510 has been reset to its original position; the switching transistor pair 580, 583 in the latching circuit are turned on; function prepare relay 585 is operated, and the switching transistor pair 530, 525 in the enabling circuit are turned on. Such condition is maintained during the period that the tape advances over the subsequent command information (D1, M1, etc.). During the tape advance the further command information relating to the mold disc control and the magazine control is registered on the respective control circuits MD, MG (FIGS. 15, 16; 18, 19).

*Operation of knife block motor*

The energizing circuit for the head adjusting motor 75 which adjusts the turret head to move the desired index pin for the knife to the proper position will not be completed until the dry cycle of the machine is initiated. It will be recalled that as the result of the registration of the coded signal K1, transistor 525 is turned on at this time. Assuming that the machine was not in cycle at the time, the knife position request signal is registered on the latching circuit, and the energizing circuit for control relay 540 is presently interrupted only by the contacts 559 on the inhibit relay 558.

It will be further recalled that during the saw positioning operation, the saw control circuitry SPC energizes relay 4R to open contacts 4R1 (FIG. 14) to thereby prevent operation of the elevate relays ER and elevate solenoid ES. As shown, elevate relay ER at contacts ER1 prevents operation of the inhibit relay 558 at this time. As the saw positioner completes the saw setting operation, relay 4R restores to close contacts 4R1 in the energizing circuit for the elevate relay ER. Normally, the tape will have advanced to complete the readout of the command information on the tape T relating to the desired position of the knife, the mold disc and the magazine prior to completion of the saw positioning, and the tape advancement has been stopped by reason of mechanical means which are a part of the conventional tape reader and operate responsive to an elevate signal on the tape. The tape reader remains disabled until an elevate operation is completed.

With readout of the elevate signal the elevate switch contacts (FIG. 14) are closed. Thus as the 4R relay restores after the saw positioning, contacts 4R1 (FIG. 14) close to complete the energizing circuit to the elevate relay ER which circuit extends from 24 volt potential over contacts 4R1, elevate switch contacts ES, and the elevate relay to +55 volt potential. Since slave relay 531 is not operated, contacts 533′ are closed and the energizing circuit for elevate solenoid ES′ is completed to start an elevate operation.

Elevate relay ER operates, and at its contacts ER1 (FIG. 13) completes the energizing circuit for the inhibit relay INR, the circuit extending from +15 volt potential over contacts 587, the winding of inhibit relay INR, and contacts ER1 to zero volt potential.

Inhibit relay INR operates, and at its contacts INR1 completes a self-holding circuit in parallel with the elevate relay contacts ER1, and at its contacts 559 completes the circuit to the control relay 540, the circuit extending from +15 volt potential over transistor 525, contacts 555, 559, and winding of control relay 540 to zero volt potential, and at its contacts 559′ energizes the TTS clutch to terminate further advance of the tape T.

Control relay 540 operates, and at its contacts 541 completes a self-holding circuit in parallel with the aforedescribed energizing circuit, the circuit extending from +15 volts over transistor 525, contacts 541, the winding of relay KCR to zero volt potential; at its contacts 542 completes an obvious energizing circuit for slave relay 531; at its contacts 544 interrupts the energizing circuit to the pot pump to prevent the pot pump from providing lead for the casting of a slug during the current cycle (dry cycle) of the machine, and at its contacts 544a prepares a charging circuit over resistor R for capacitor C in the false slug circuit.

Slave relay 531 operates, and at its contacts 532 operates the knife block valve KBV (FIG. 14) to provide hydraulic power to the adjusting mechanism which moves the knife away from the turret head, at its contacts 533 prepares a circuit to operate the master control valve MV for the hydraulic system (which remains disabled until switch contacts 538 close after approximately 25% of the cycle has been completed), and at its contacts 534 opens a point in the circuit for elevate solenoid ES.

As the elevate solenoid operated, it was further effective to initiate cycling of the linesetting machine in a "dry" cycle, in which the machine operates but does not cast a slug.

A predetermined interval after initiation of the machine cycle by the elevate solenoid, cycle switch contacts CS are mechanically opened to interrupt the circuit to the cycle relay CR (which restores) and at its contacts 555, opens the initial operating circuit to control relay 540 which holds over contacts 541. Simultaneously, the cycle relay 554 closes contacts 556 to complete a charging circuit for capacitor 537 which extends from +15 volts over transistor 525, contacts 555, 559, 556, capacitor 537 and resistor 536 to −5 volt potential.

Digressing briefly at this point, if the machine was in cycle at the time the knife position request signal was registered on the latching circuit to energize function prepare relay 585 and inhibit relay 558, the cycle relay 554 will be restored and the control relay 540 will be held restored by open contacts 555. In such event the control relay 540 is operated to initiate the desired setting when the cycle is completed and cycle relay 540 is energized.

At such time as the machine advances through approximately the first 25% of its cycle, switch 538 closes to complete the circuit to the master valve MV for the hydraulic system. As the master valve opens, the knife is moved away from the index pins on the turret head and switch contacts 591 are closed to complete an operating circuit for the motor 75 and the parallelly-connected solenoid 120, the circuit extending from one side of the 110 volt A.C. source over the contacts 586, switch contacts 591, in parallel over motor 593 and solenoid 120, and the other side of the 110 volt A.C. source.

The solenoid 120 operates to disengage the detent from the turret head, and motor 75 which may be a conventional A.C. gear motor which operates at approximately 35 r.p.m., rotates the head to advance the turret head in the manner described herein. The detent is held withdrawn by the solenoid 120 to permit such movement until such time as the power is removed, and the motor 75 continues to rotate until the turret head advances to the position which achieves positioning of the knife at the requested setting.

A rotatable position marking switch 595 having a contact finger 217 connected to positive 55 volt potential is rotated with the motor to successively engage different ones of the contacts 217 and marking conductors MK1–MK7 as the head is moved to the successive knife setting positions. With the head set to locate the knife in position 1, the contact finger 217 on switch 595 engages marking conductor MK1 of the group of conductors MK1–MK7. In a like manner, when the head is set to locate the knife in position 2, the contact finger engages conductor MK2, etc. Assuming in the present example, that the head was at position 6 as the motor 75 is energized, the turret head and associated switch 595 are moved in a clockwise direction to advance the contact finger 217 into engagement with each of the marking conductors MK7, MK1, and the positive 55 volt potential is applied to the conductors MK7, MK1 which are connected to the latching circuits 567, and 561 respectively.

In that the switching relay pair in latching circuit 567 (similar to switching pair 580, 583 in latching circuit 561) are turned off, the connection of +55volt potential thereto will not result in any change in such circuit. However, as the contact 217 advances into engagement with the marking conductor MK1, positive 55 volts is extended over conductor 569, diode 576, and resistor 575 to turn off transistor 580 in the latching circuit 561. The potential on conductor MK1 also results in the energization of transistor 589 in the indicator circuit KB1 which in turn completes an energizing circuit to indicator lamp 599.

As transistor 580 in the latching circuit 561 is turned off, the negative potential which appears at the collector thereof also occurs at the base of transistor 583 to turn off transistor 583, and thereby interrupt the energizing circuit for the function prepare relay 585 which restores, and at its contacts 586 interrupts the energizing circuit for head motor 75. As a result the motor 75 coasts to rest, and the solenoid 120 is de-energized to release the detent latch 114.

The motor 75 coasts by reason of inertia to drive the detent latch 114 into the detent slot associated with such position. A friction clutch 84 allows over-coasting without damaging the gears.

Function prepare relay 585 at its contacts 587 interrupts one of the energizing circuits to the inhibit relay 1NR. That is, as will be shown, in the event that none of the latching circuits 661–666 (FIGURE 5) for the mold disc control circuitry have been marked (i.e., no tape signal has been received requesting a mold disc setting), and in the event that no signal information relating to the magazine position is received, the inhibit relay 1NR will restore. Alternatively, if the readout contacts CS0–CS5 have detected either a signal on the tape relating to a desired mold disc position or a signal relating to a desired magazine position, the inhibit relay 1NR will be held operated over corresponding ones of parallel contacts 642, 687' (FIG. 15) or corresponding contacts in the magazine circuitry shown in the copending application filed Sept. 13, 1965 by George Robert Jackson and Patrick J. McCauley, Serial No. 486,638.

In the event either the turret head, the head motor 75, or the position marking switch 595 have jammed, and did not reach the requested position registered on the latching device 561, the +55 volt signal would not be transmitted over marking conductor MK1 to the latching circuit 561, and function prepare relay 585 would hold and the inhibit relay 1NR would be held operated. Accordingly, even though a mold disc and/or a magazine request were made and satisfied, the failure to satisfy the knife position request would result in a locked up condition of the function prepare relay 585 and the inhibit relay 1NR, and accordingly the tape T would not be advanced until such time as the malfunction was located and corrected. After approximately one minute a timing circuit (not shown) removes power from all circuits.

As the dry cycle of the machine continues, and approximately 85 percent of the cycle has been completed, master valve switch contacts 538 (FIG. 14) open to interrupt the energizing circuit for the master valve MV in the hydraulic system to relieve the pressure from the system, and switch contacts 591 are opened to interrupt a further point in the circuit to the motor 75. It should be further noted that if a malfunction had occurred wherein the function prepare relay 585 had not restored, the restoration of the master valve MV as a result of the machine cycling would result in interruption of the circuit to the motor 75, and the de-energization thereof.

At the end of the dry run, cycle switch contacts CS (FIG. 13) are mechanically closed to energize the cycle relay 554 which operates, and at its contacts 555 closes a point to reprepare the original energizing circuit for control relay 540; at its contacts 557 connects the capacitor 537 over a discharge circuit which includes resistor 536, 546, transistor 550 and resistor 522 to −15 volt potential.

As capacitor 537 discharges over such circuit, the positive potential applied to the base of transistor 550 turns off transistor 550, and the resultant negative potential at the collector element thereof appears at the base of transistor 530 which turns off, and in turn provides positive potential at the base of transistor 525, which turns off. With the turn-off of transistor 525, the energizing circuit for control relay 540 and the latching circuit for transistor 530 is interrupted.

Control relay 540 restores, and at its contacts 541 further interrupts its self-holding circuit, at its contacts 542 effects the release of slave relay 531, at its contacts 544a connects the charged capacitor C to the false slug detector circuit which purposely results in an indication that a slug has been detected (even though it has not) so that the equipment will not inadvertently be locked in the cycling of the machine, and at its contacts 544 restores the pot pump circuit.

Slave relay 531 restores, and at its contacts 532 interrupts the holding circuit for the knife block valve 534 (FIG. 14); at its contacts 533 interrupts a further point in the circuit to the master valve MV (FIG. 14), and at its contacts 533' reestablishes a point in the energizing circuit for the elevate solenoid ES, which at this time is interrupted by the elevate switch contacts ES which were opened immediately after the elevate cycle was completed.

The discharge circuit for capacitor 537 (FIG. 13) which as noted above was completed over cycle relay contacts 557, resistor 546 and 552 to —15 volt potential, also resulted in a positive potential signal being applied over conductor 568, diode 632 and resistor 631 to the base of transistor 630 in the mold disc control circuitry MD. As will be shown, in the event that information on the tape indicates that a mold disc control adjustment is desired (in which event, one of the mold disc registers 661–666 would be enabled to indicate the nature of the mold disc positioning desired), or alternatively if a magazine change has been requested (and a corresponding one of the magazine control circuits are marked) negative bias will have been removed from the base of transistor 630, and accordingly as the positive signal is received over conductor 568 from the knife block control circuitry KB following adjustment of the knife to its desired position, transistor 630 will turn on.

If neither a mold disc request or a magazine request has been detected, transistor 630 will remain turned off. In such event, each of the contacts 587 (FIG. 13), 687' and 642 (FIG. 15) and MR1–MR4 (FIG. 18) will also be open, and the energizing circuit for the inhibit relay 1NR will be interrupted so that advancement of the tape once more occurs. The machine is now operating in a normal line setting mode.

Assuming, however, that either an instruction for a mold disc change or a magazine change was detected, transistor 630 turns on, and the more negative voltage which appears at the collector thereof also occurs at the base of transistor 625, which turns on to complete an energizing circuit for the control relay 640, which circuit extends from +15 volts over transistor 625 and the winding of relay 640 to zero volts potential. The energizing circuit completed over transistor 625 is also extended over diode 621 and resistor 620 to the base of transistor 630 to hold same operated after the input signal received over conductor 568 from the knife block circuit KB is removed.

It will be apparent therefrom that as the knife block control circuitry KB completes adjustment of the knife to the position requested, a control signal is transmitted to the mold disc control circuitry MD to cause same to operate next in sequence to adjust the mold disc to the position indicated on the tape and registered on the latching circuit 661–666.

During such adjustment, the mold disc circuitry MD provides an inhibit signal to prevent a major shift by the magazine control circuitry. In the event that no information has been detected requiring setting of the mold disc, but information relative to a magazine condition change has been detected, the mold disc circuit MD will automatically enable the magazine control circuitry MG to proceed in the adjustment of the magazines to the desired position, as will be shown.

*Mold disc*

The mold disc accommodates a number of different molds so that slugs of different thicknesses may be cast. In the field, the number of molds on the machines which may be manually selected normally range between two to six. In the arrangement set forth herein, the mold disc is shown to include six molds. A novel mold disc control circuit MD (FIGS. 15 and 16) is responsive to the detection of predetermined mold disc control signals on the tape to automatically adjust the mold disc to the one of the positions indicated by the signal. Since a given slug thickness is determined by the mold pocket selected, and the resultant slug must be shaped by a knife block setting of a like thickness, the knife block and the mold disc are normally adjusted together. However, in some instances, independent adjustment may be desired, and the control circuitry of the invention is so operative.

The control circuitry for adjusting the mold disc to the desired position in response to the tape signals is now set forth herebelow.

*Mold disc control circuitry MD*

With reference to FIGURE 15, the mold disc control circuitry MD as there shown basically comprises latching or register circuits 661–666, each of which is connected to a different one of the matrix conductors N1–N6 to register a request for a correspondingly different one of the six mold positions, a selection circuit 600 which is operative responsive to receipt of a signal over the matrix conductor "D" to enable the six register circuits 661–666 to respond to the signal request extended by the matrix M over conductor N1–N6 to the mold disc latching circuits 661–666. As will be shown, the latching circuit associated with the received digit will respond to the marking signal. Matrix conductor "N0" is connected to a reset circuit for the selector circuit 600.

A switching pair 625, 630 is connected over conductor 568 to the output of the knife block control circuit KB, and also to the selector circuit 600 to control the time of operation of the mold disc control circuitry MD in accomplishing the command registered on the latching circuits 661–666. A series bias or marking circuit connected to transistor 625 of the switching pair is operative to mark the receipt of a request for a mold disc setting or a magazine setting. With such marking, the circuit will be in condition to initiate a control operation as the sequence signal is received from the knife block circuitry KB. A disc mold control relay 640 is connected for operation by the switching pair as the control operation is initiated in response to the sequence signal from the knife block control circuitry KB, and as will be shown the relay 640 energizes the tape inhibit relay 1NR to prevent advance of the tape T, and prepares both the mold disc solenoid 690 and the magazine control circuitry MG for operation.

A function prepare relay 685 is connected common to the outputs of register circuits 661–666, and is operative with the control relay 640 to control positioning circuit SSC, which includes disconnect solenoid 690 for controlling the energization of a pulse relay 696 over high limit contacts 694 and low limit contacts 695 on the rotary solenoid 702 to provide stepping pulses to the rotary solenoid 702. As noted above, operation of solenoid 702 results in adjustment of the mold disc MD to successive ones of the positions.

Indicator means for indicating the mold disc position comprise a rotary switch 706 which is operative with movement of the mold disc to different positions to provide signals back over different ones of a plurality of contacts 708 and associated marking conductors MD1–MD6 to correspondingly different ones of the latching circuits 661–666. At such time as the indicated one of the mold disc positions is reached, the corresponding one of the latching circuits 661–666 is unlatched to restore common function prepare relay 685, and thereby terminate the mold disc adjusting operation. Function prepare relay 685 in restoring also enables the magazine control circuitry MG to effect operation of the magazine to the condition indicated by the tape information. Switching pair 625, 630 and control relay 640 hold operated until the magazine setting is completed.

*Specific description of mold disc control circuitry*

The mold disc control circuitry MD is now set forth in detail. As shown in FIGURES 15, 16 the six matrix conductors N1–N6 are connected to the inputs for six latching circuits 661–666, input conductor D from matrix M is connected to selector circuit 600, a matrix conductor "N0" connected to reset circuit for selector circuit 600, and an enabling or sequence lead 568 from the output of the knife block control circuit MD is connected to the input from a switching pair 625, 630.

The selector circuit 600 for mold disc control circuit MD which is connected to matrix conductor "D" basically comprises a flip-flop circuit including a first and second transistor 605, 610 which may be of the type commercially available as a 2N1302. The first transistor 605 includes an emitter element connected to zero volt potential, a base element connected (a) over resistor 603' to the system reset conductor 503 (FIG. 12), (b) over resistor 601 to the matrix conductor "D," (c) to the junction of resistors 602, 606 in voltage divider 602, 606, 607 which is connected between negative five volt potential and positive fifteen volt potential, and (d) over resistor 606 to the collector element of transistor 610; and a collector element connected over resistor 612 to positive 15 volt potential, and over resistor 613 to the base of the second transistor 610.

The second transistor 610 of the flip-flop selector circuit 600 includes an emitter element connected to zero volt potential, a base element connected to the junction of resistors 613, 614 of voltage divider 612, 613, 614 which is, in turn, connected between positive 15 volt potential and negative 5 volt potential, and a collector element connected over resistor 607 to positive 15 volt potential, and also over resistor 606 to the base of transistor 605, and further to the common control conductor 624 for each of the mold disc latching circuits 661–666. Capacitor 608 is connected between positive 15 volt potential and conductor 624.

In the normal linesetting condition, positive 55 volts potential on reset conductor 503 is applied over resistor 603' to the first transistor 605 which is therefore turned on. The resultant zero potential which occurs at the collector thereof results in a negative potential at the base element of transistor 610, which is therefore turned off. As a result, positive 15 volt potential is connected over control conductor 624 to the input circuits of the register 661–666 to inhibit the response thereof to any input signals which may appear on matrix conductors N1–N6.

The matrix conductor "N0" is connected over resistor 616 to the base element of transistor 615 which may be of the type commercially available as a 2N1303. The base element is connected over capacitor 617 to zero volt potential to provide a time delay in the switching of transistor 615. The collector element of transistor 615 is connected to the base of the second transistor 610 of the flip-flop selector circuit 600. As will be set forth, transistor 615 is normally off, and a signal on the "N0" conductor controls transistor 615 to turn on to reset flip-flop circuit 605, 610 a predetermined period after registration of the mold disc digit on the appropriate one of the latching circuits 661–666.

Since latching circuits 661–666 are similar in structure, only latching circuit 661 is set forth in detail. As shown, latching circuit 661 includes a first input circuit including resistor 671 connected between matrix conductor N1 and the base element of emitter follower transistor 670. The base element of transistor 670 is further connected over resistor 672 to common control lead 624 which is output from the selector circuit 600.

Transistor 670 further includes a collector element connected to −15 volt potential and an emitter element connected over resistor 673 to +5 volt potential and further over resistor 674 to the base element of transistor 680. The base element of transistor 680 is further connected over resistor 675 and diode 676 to a reset circuit which is enabled whenever the mold disc is in position 1. The emitter element of transistor 680 is connected to zero volt potential, and the collector element is connected over resistor 682 to the base of transistor 683 and also over resistor 681 to −20 volt potential.

Transistor 683 further includes an emitter element connected to negative 15 volt potential, and a connector element connected over resistor 689, diode 688 and resistor 687 to provide a latching circuit for its associated transistor 680, and is further connected over resistor 684, and the winding of function prepare relay 685 to positive 15 volt potential. The junction of resistor 684 and relay 685 is connected to the same point in the output circuit of each of the register circuits 662–666.

In the reset condition, positive potential on conductor 624 will normally inhibit the input circuits connected to matrix conductors N1–N6, whereby signals which appear on matrix conductors 1–6 will be ineffective to operate the switching pair, such as 680, 683. That is, transistor 670 being an emitter follower will extend that positive potential on conductor 624 to the base of transistor 680 which turns off, and the negative signals on conductors N1–N7 will be ineffective. The negative signal which occurs in the collector of transistor 680 and at the base of transistor 683 when transistor 680 is turned off will maintain transistor 683 turned off. As a result, function prepare relay 685 will be in the restored condition.

As indicated above, the mold disc control circuit MD is enabled to effect a mold disc adjustment only after the knife block setting is complete. The enabling or sequencing conductor 568 for the mold disc control circuitry extends from the knife block control circuit KB over an input circuit including diode 632, resistor 631 to the input for a switching pair 625, 630.

More specifically, transistor 630 of the switching pair 625, 630 comprises an emitter element connected to zero volt potential, a base element connected to the control conductor 568 as described above, and over resistor capacitor network 618, 619 to −5 volt potential, and over resistor 622 to a series bias circuit which includes contacts on each of the control relays for the four different magazines (contacts MR1, MR2, MR3, MR4), as well as over the contacts on function prepare relay 685 for the mold disc circuit MD, and contacts on relay 700 (FIG. 16) which, as described hereinafter, is operated whenever a mold disc adjustment is being effected. With the series bias circuit closed, a −5 bolt bias is placed on the base of transistor 630 to maintain the transistor 630 turned off, even if an enabling signal is received over conductor 568 from the knife block circuit KB. If any one of the series contacts is in the open position (as the result of readout of a signal on the tape for a mold disc setting or a magazine setting) and only in such event, an enabling signal received over conductor 568 will turn on transistor 630 to initiate a mold disc adjustment.

Transistor 630 further includes an emitter element connected to zero volt potential and a collector element connected over resistors 622 to the base of transistor 625 and also over resistors 622, 623 to positive 20 volt potential.

Transistor 625 of switching pairs 625, 630 includes an emitter element connected to positive 15 volt potential, a base element connected to the output of transistor 630 as described above, and a collector element connected over the winding of relay 640 to zero volt potential, and over resistor 626 to zero volt potential. The collector is further connected over a holding circuit for transistor 630 which includes diode 621 and resistor 620 for the purpose of holding the switching pair 625, 630 turned on after the momentary enabling signal on conductor 568 from the knife block circuit KB is terminated.

As noted above, with any of the magazine control relays MR1–MR4 operated, indicating that a magazine control function is required, or with the function prepare relay 685 operated indicating that a mold disc function has been requested, the bias signal for transistor 630 will be removed to permit same to operate with the receipt of a signal over conductor 568 from the knife block circuitry. Normally, however, a bias is provided to transistor 630 by the series bias circuit, and the transistor 630 is cut off. The resultant positive potential which appears at the collector of transistor 630 and the base of transistor 625 maintains transistor 625 turned off, and control relay 640 is therefore in the restored condition. Control relay 640 at contacts 642 controls energization of the tape inhibit relay INR, and at contacts 641 controls a point in the circuit for the mold disc positioning circuitry SSC (FIG. 16), and at contacts 686' controls enablement of the magazine control circuitry MG after operation of the mold disc circuitry MD.

The mold disc positioning circuit SSC is operative to adjust the mold disc to different positions, and associated indicator circuits, such as 715, provides signals to indicate the location of the mold disc as adjusted to the different positions.

More specifically, the positioning circuitry SSC includes a disconnect solenoid 690 which is controlled by an energizing circuit including contacts on the control relay 640 and series contacts on the function prepare relay 685. Disconnect solenoid 690 controls a control switch 691 (as noted earlier herein) which in turn controls an energizing circuit for series bias circuit control relay 700, and an operating circuit for pulsing relay 696.

Series circuit control relay 700 controls the connection of potential to the series bias circuit for transistor 630 (FIG. 15) and in its operated condition prevents the disc mold control circuitry MD from restoring until such time as the necessary adjustment is completed.

Pulsing relay 696 is controlled by an energizing circuit including an upper limit microswitch 694 and a lower limit microswitch 695, which cooperate in a manner set forth hereinafter to effect the intermittent operation of the pulsing relay 696 which at its contacts 698 controls stepping of the rotary solenoid device 702.

The rotary solenoid 702 through mechanical linkage 760 drives a rotating wiper 709 of rotary switch 76 into engagement successively with each of a plurality of contacts 708 and associated marking conductor MD1–MD6, each of which contacts represents a different one of the six positions of the mold wheel. That is, as indicated above, the rotary solenoid 702 is operable to move the contact arm 709 to each of six positions, and as moved to a position, such as the first position, connects positive 55 volts over the associated marking conductor, such as MD1, which is located at such position. Each marking conductor MD1 is connected to the input for its own indicator circuit, such as 715, which includes a transistor 713 for energizing lamp 714 whenever the mold disc is in the position represented thereby and a reset conductor 669 for the one of the latching circuits 661–666 which represents such position. Each of the latching circuit reset conductors, such as 669, for the first latching circuit is connected to its associated one of the latching circuits over a diode, such as 676, and a resistor, such as 675, which is connected to the input for the switching pair, such as 680, 683.

*Operation of mold disc control circuitry MD*

As noted above, with the equipment in the control position (that is, before the receipt of the UR, UR signals which block the machine from effecting a normal line setting operation), reset switch contacts R (FIG. 12) are closed and positive 55 volt potential is extended over the reset conductor 503 to the selector circuit 600 (FIG. 13) in the mold disc control circuitry MD. At such time as the tape is advanced to move the upper rail signals UR, UR into the readout position, the linesetting equipment is blocked as set forth above and in more detail in the copending application, Serial No. 407,200, and reset switch contacts R (FIG. 12) are opened to remove the positive 55 volt potential from conductor 603 and selector circuit 600 for the mold disc control circuit MD.

With advancement of the tape T and movement of the letter "D" for readout by the tape reader TR, sensing contacts CS1 and CS4 are closed to matrix M, and a negative signal is provided by matrix M over conductor D to the selector circuit 600 (FIG. 15).

It will be recalled that with positive 55 volt potential on the reset conductor 503, transistor 605 (FIG. 13) in the mold disc control circuitry MD is turned on, and transistors 610 and 615 are turned off. In the latching circuits, such as 661–666, relays 680, 683 are also turned off. As a result, function prepare relay 685 is restored, and disconnect solenoids 690 and 702 (FIG. 16) are in the deenergized condition with relays 696, 700. Assuming that an enabling signal has not been received from the knife block control circuitry KB at this time, transistors 630, 625 (FIG. 13) will be turned off and control relay 640 will be restored.

With the reset signal removed from reset conductor 693, and the transmission of a negative signal over matrix conductor D and resistor 601 to the base of transistor 605, the transistor 605 is turned off, and the resultant positive-going signal at the collector thereof appears at the base of transistor 610 which turns on to remove positive 15 volt potential from conductor 624, and connect zero volt potential thereto. With zero potential on the input conductors to the latching circuits 661–666 any signal received over conductor N1–N6 from the matrix M will be registered by latching circuits 661–666.

As the tape now advances, and the digits associated with the letter D on the tape (digit 1 in the present example) is moved into the readout position, fingers CS0, CS1, CS3, CS4, CS5 are closed, and a negative signal is extended over matrix conductor N1 and conductor N0. The signal over conductor N1 is extended over resistor 671 to the base of emitter follower 670 which in turn applies a negative signal to the base of transistor 680.

Transistor 680 turns on, and the zero volt signal which occurs at the collector element which results in a less negative potential at the base of transistor 683, which turns on to complete an energizing circuit for function prepare relay 685, which extends from positive 15 volt potential over the winding of relay 685, resistor 684, and transistor 683 to negative 15 volt potential. Transistor 683 also completes the latching circuit for the transistor 680 which extends from negative 15 volts potential over transistor 683, resistor 689, diode 688 and resistor 687 to the base of transistor 680 to maintain same conductive as the signal received over the matrix conductor N1 is subsequently removed.

As noted above, each time a digit 1–9 is marked on the matrix M, the matrix also marks the "N0" conductor, and such signal is coupled over the resistor 616 to the base of transistor 615 in mold disc control circuitry MD. After a delay determined by the value of the capacitor 617, transistor 615 turns on to couple −5 volt battery potential to the base of transistor 610 which turns off, and the positive potential which appears at the collector thereof is extended to the base of transistor 605 to turn transistor 605 on, and is also extended over control conductor 624 to the input circuit for each of the latching circuits 661–666 to inhibit response thereof to any further markings which may appear on the matrix conductors 1-6 during the period that the equipment is in the marked position. Thus the latching circuits 661-665 are enabled only momentarily for the purpose of registering a mold disc request (i.e., from the time of receipt of the signal on conductor "D" until reset a brief interval after the receipt of the signal on conductor "NO").

As function prepare relay 685 operates responsive to the registration of a digit on one of the latching circuits (latching circuit 661 in the present example), it is operative at its contacts 686 to prepare a point in the operating circuit to the disconnect solenoid 690 (FIG. 16), at its contacts 686' opens a point in the control circuitry for the magazine control circuitry MG to prevent the operation thereof during the setting of the mold disc to the desired position, at its contacts 687' completes a circuit for the tape inhibit relay INR (in parallel with the circuit completed by the knife block circuit KB) and at its contacts 685' interrupts a point in the series bias circuit for switching pair 625, 630 to permit response of the switching pair 625, 630 to the sequence enabling signal as received from the knife block control circuitry KB.

In brief review, at this time, the switching pair 680, 683 in latching circuit 661 are energized to indicate that the mold disc is to be moved to position one.

It is now assumed that the knife block adjustment is completed and that a control signal is extended over conductor 568 by the knife block control circuitry KB, and the diode 632 and resistor 631 to the base of transistor 630. Assuming the bias has been removed from the base of transistor 630 by reason of the operated condition of the function prepare relay 685 (or one of the magazine control relays indicating that a magazine control function is to be effected), transistor 630 turns on, and the resultant zero voltage which appears at the collector thereof results in a less positive potential at the base of transistor 625, which turns on to complete the operating circuit for the control relay 640 from positive 15 volts over transistor 625 and the winding of relay 640 to zero volt potential.

Transistor 625 as turned on also completes a latching circuit over diode 621 and resistor 620 to the base of transistor 630 to latch same in the "on" condition after removal of the enabling signal from conductor 568 by the knife block control circuitry KB.

Control relay 640 operates, and at its contacts 641 completes an energizing circuit to the disconnect solenoid 190, at its contacts 642 completes a parallel energizing circuit to the tape inhibit relay INR, at its contacts 643 (FIG. 15) completes a point in the operating circuit for the magazine control circuitry (which is presently held open by function prepare relay 685 at its contacts 686').

As noted above, inhibit relay INR was operated during the operation of the knife block circuitry KB and at its contacts INR2 energized the tape clutch to prevent advancement of the tape. The parallel circuit completed by control relay 640 in the mold disc control circuit MD accomplishes a similar function to prevent advancement of the tape during adjustment of the mold disc to the desired position and the magazines to the desired condition.

Disconnect solenoid 690 operates to disconnect the normal machine drive from the mold wheel and to disengage the shot pin 170 to permit adjustment of the mold wheel to a new position by the driving mechanism. Additionally control switch 691 is closed with operation of disconnect solenoid 190 (as noted above) to complete an energizing circuit from the positive side of bridge rectifier 695 over switch 691, resistor 693, microswitch contacts 694, 695, and the winding of pulsing relay 696 to the negative side of bridge rectifier 695. As noted earlier herein, microswitch contacts 694, 695 are controlled by the rotary solenoid, the lower limit contacts 695 being closed with the rotary solenoid in its first position as determined by the return spring 41 (FIG. 3 of our copending application having Serial No. 459,792, which was filed May 28, 1965). Upper limit contacts 694 are, of course, closed at such time, and are opened as the rotary solenoid reaches the upper end of its structure.

Simultaneously with the completion of the circuit to the pulsing relay a parallel circuit is completed for bias control relay 700 from the positive side of rectifier 695 over control switches 691 and the winding of relay 700 to the negative side of rectifier 695.

Bias control relay 700 operates, and at its contacts 701 opens a further point in the biasing circuit for sequencing transistor 630 to prevent the turnoff thereof in the event the function prepare relay 685 restores before the mold disc has been fully operated to the position indicated by the tape signals.

After a delay, which is determined by the value of capacitor 699, pulsing relay 696 operates, and at its contacts 698 completes an energizing circuit to the rotary solenoid 702, and at its contacts 697 completes a holding circuit independent of the original energizing circuit which extended over the lower limit microswitch contacts 695.

As the solenoid 702 advances from its restored position, lower limit microswitch contacts 695 open, and pulsing relay 696 is held over the described holding circuit. As the rotary solenoid advances to the upper end of its stroke, upper limit switch contacts 694 are opened to interrupt the holding circuit for the pulsing relay 696 which restores, and at its contacts 698 interrupts the energizing circuit for the rotary solenoid 702. As the energizing circuit for the rotary solenoid is operative to advance the mold disc one step, and the upper arm 709 is advanced to mark a corresponding different one of the conductors MD1-MD6. Such operation continues until such time as the mold disc is moved to the desired position, and at such time, as will now be shown, the control circuitry MD restores function prepare relay 685 to interrupt the energizing circuit for the disconnect solenoid 690 and thereby terminate the operation of the rotary solenoid 702.

More specifically, as the wiper arm 709 is advanced to the particular one of the marking conductors MD1-MD6 which is associated with the one of the latching circuits which has been marked (latching circuit 661 has been marked in the present example to indicate the mold disc is to be removed to the first position), positive 55 volts is applied by wiper arm 709 over such conductor to reset the latching circuit and terminate the adjusting operation.

In the present example, positive 55 volts on conductor MD1 turns on transistor 713, and completes an energizing circuit for the indicator lamp 714. Additionally the positive 55 volts potential on conductor DM1 is extended over conductor 669 and diode 676 (FIG. 15) and resistor 675 to the base of transistor 680 to turn off transistor 680.

As transistor 680 turns off, the resultant negative voltage which occurs at the collector thereof and the base of transistor 683 causes transistor 683 to turn off, and thereby interrupt the energizing circuit for the function prepare relay 685. Function prepare relay 685 restores and at its contacts 686 interrupts the energizing circuit for disconnect solenoid 690, at its contacts 687' interrupts the energizing circuit for inhibit relay INR (which is held operated over contacts 642 on control relay 640), at its contacts 686' prepares a point in the enabling circuit for the magazine control circuitry MG, and at its contacts 685' reestablishes a point in the biassing circuit for switching pair 625, 630.

Disconnect solenoid 690 restores, and allows the shot pin to restore against the collar with spring pressure. However, microswitch contacts 691 will not open until the shot pin enters the aperture associated with position "1" and accordingly pulsing relay 696 is held energized. At such time as the shot pin falls into the hole for the selected position, contacts 691 open to interrupt the energizing circuit for pulsing relay 696 which restores to terminate rotation of the solenoid 702 and the mold disc.

Assuming that no magazine command was present on the tape T, none of the magazine control relays will be energized. In such event, as the control switching contacts 691 open, the bias control relay 700 restores, and at its contacts 701 completes the negative 5 volt biasing circuit for transistor 630 which turns off. The resultant positive voltage which occurs at the collector thereof also appears at the base of transistor 625 to turn transistor 625 off and thereby interrupt the energizing circuit for control relay 640. Control relay 640 restores and at its contacts 641 interrupts a further point in the circuit for the disconnect solenoid 690, and at its contacts 642 interrupts the energizing circuit for the inhibit relay INR, and at its contacts 643 completes a point in the circuit for the magazine control circuitry which circuit is held ineffective.

With the restoration of the INR relay (assuming no magazine control is to be effected at this time) the contacts INR1 are opened, and the tape reader advances the tape to effect readout of the further tape signals. Accordingly, the mold disc control circuitry MD is now restored in preparation for an operation responsive to further tape signals.

In the event that the tape did include a command for effecting adjustment of the magazines to a different position, one of the relays MR1–MR4 would be energized and the above identified series bias circuit to the base of transistor 630 would be in the open condition. With switch pair 625, 630 operated, the control relay 640 in the mold disc control circuitry would have been maintained operative when the control relay 700 restored.

As a result, with control relay 640 held operated, contacts 642 would maintain the energizing circuit for the inhibit relay INR, and the tape member T would not be advanced at this time. Further, in that contacts 643 are in the closed position, an energizing circuit would be completed to magazine control circuitry as the function prepare relay 685 restores to close contacts 686′. The manner of operation of the magazine control circuitry to effect adjustment of the magazines to the desired position is set forth in the copending application, having Serial No. 486,638 which was filed Sept. 13, 1965.

A cutout relay 710 is connected to be energized by cycle relay 554 whenever the machine is in cycle (contacts 554) or whenever a main cutout relay (not shown) is operative. Relay 710 at its contacts 707 interrupts +55 volts (ground) to the wiper arm 709 to prevent the wiper arm from cancelling out information registered on the latching registers 661–666 during normal cycling of the machine.

While we have illustrated and described what is regarded as the preferred embodiment of the invention, nevertheless it will be understood that such illustration is merely exemplary and that numerous modifications may be made therein without departing from the essence of the invention.

What is claimed is:

1. In trimming knife means for a linecasting machine, a stationary knife, a knife block, a slidably mounted knife carrier, a knife assembly movable with said carrier yieldingly urged toward the latter and comprising an adjustable knife opposed to said stationary knife and movable with said carrier toward and away from said stationary knife, adjustable stop means having a plurality of different positions for varying the extent of movement of said carrier away from said stationary knife, means yieldingly holding said carrier in pressure contact with said stop means, means for providing signals indicating the desired one of said different positions to which the adjustable stop means is to be moved, power operated means effective for moving said carrier and the adjustable knife toward the stationary knife, and drive means for operating said adjustable stop means to the position indicated by said signals, control means responsive to said signals to operate said drive means and said power operated means, and means operative with movement of the adjustable stop means to the desired position to terminate operation of said drive means and said power operated means to release said carrier for reverse movement thereof into contact with said stop means.

2. A trimming knife means for a linecasting machine as set forth in claim 1 in which said adjustable stop means comprises a rotatable member having a plurality of stop members of various lengths thereon selectively positionable with operation of said stop means to said different positions to vary the extent of movement of said carrier away from said stationary knife.

3. A trimming knife means for a linecasting machine as set forth in claim 1 which further includes manually operable means independent of and without energizing said drive means.

4. In trimming knife means for a linecasting machine, a stationary knife, a knife block, a slidably mounted knife carrier, a knife assembly movable with said carrier yieldingly urged toward the latter and comprising an adjustable knife opposed to said stationary knife and movable with said carrier toward and away from said stationary knife, a rotatable turret head, drive means for said rotatable turret head, and a plurality of stop pins of various lengths carried by said head and selectively positionable for contact by said carrier for limiting the extent of movement thereof away from said stationary knife, means for yieldingly holding said carrier in pressure contact with a selected stop pin, power operated means effective for moving said carrier away from said selected stop pin to enable positioning of another pin for contact by said carrier, and control means for selectively rendering said power means effective to operate said carrier away from the selected stop pin, and to thereafter energize said drive means to rotate said rotatable turret head to a new position.

5. In trimming knife means for a linecasting machine, a stationary knife, a knife block, a slidably mounted knife carrier, a knife assembly movable with said carrier yieldingly urged toward the latter and comprising an adjustable knife opposed to said stationary knife and movable with said carrier toward and away from said stationary knife, a manually rotatable turret head, a plurality of stop pins of various lengths carried by said head spaced apart circumferentially thereof and selectively positionable by rotation of said head for contact by said carrier for limiting the extent of movement thereof away from said stationary knife, means for yieldingly holding said carrier in pressure contact with said selected stop pin, said carrier extending across an outer segment of said turret head and having openings for receiving pins of greater length than said selected pin and disposed adjacent and at opposite sides thereof, power operated means effective for moving said carrier away from said selected stop pin to enable positioning of another pin for contact by said carrier, and means for rendering said power means effective and ineffective.

6. In trimming knife means for a linecasting machine, a stationary knife, a knife block, a slidably mounted knife carrier, a knife assembly comprising an adjustable knife opposed to said stationary knife, means yieldingly holding said assembly in pressure contact with said carrier for movement therewith toward and away from said stationary knife, a rotatable turret head, a plurality of stop pins of various lengths carried by said head and selectively positionable for contact by said carrier for limiting the extent of movement thereof away from said stationary knife, means for yieldingly holding said carrier in pressure contact with a selected stop pin, power operated means effective for moving said carrier away from said selected stop pin to enable positioning of another pin for contact by said carrier, and means for optionally rendering said power means effective and ineffective.

7. In an adjustable knife block for use with a linecasting machine, a slidably mounted knife carrier, a knife assembly comprising an adjustable knife and yieldingly urged toward and movable with said carrier in knife opening and closing directions, adjustable stop means operable to different positions to vary the extent of movement of said carrier in knife opening direction, means yieldingly holding said carrier in pressure contact with said stop means, means for providing signals indicating a desired one of said positions to which said adjustable stop means is to be moved, power operated means effective for moving said carrier and the adjustable knife toward said stationary knife and drive means for operating said adjustable stop means to the position indicated by said signals, control means responsive to said signals to operate said drive means and said power operated means, and means for terminating operation of the drive means with movement of the adjustable stop means to the desired position and disablement of said power operated means to release said carrier for reverse movement into contact with said stop means.

8. In an adjustable knife block for use with a linecasting machine, a slidably mounted knife carrier, a knife assembly comprising an adjustable knife and yieldingly urged toward and movable with said carrier in knife opening and closing directions, a rotatable turret head, a plurality of stop pins of various lengths carried by said head and selectively positionable for contact by said carrier for limiting the extent of movement thereof in knife opening direction, means yieldingly holding said carrier in pressure contact with a selected pin, power operated means effective for moving said carrier away from said selected pin, means for providing signals indicating a desired one of said positions to which said head is to be moved, drive means for said head, control means responsive to said signals to operate said drive means and said power operated means, means for terminating operation of said drive means and power operative means with movement of said head to the desired position, and manual control means effective for selectively rendering said power operated means effective independent of said drive means for said rotatable turret head.

9. In an adjustable knife block for use with a linecasting machine, a slidably mounted knife carrier, a knife assembly comprising an adjustable knife and yieldingly urged toward and movable with said carrier in knife opening and closing directions, a manually rotatable turret head, a plurality of stop pins of various lengths carried by said head spaced apart circumferentially thereof and selectively positionable by rotation of said head for contact by said carrier to limit the extent of movement thereof in knife opening direction, means yieldingly holding said carrier in contact with a selected pin, said carrier extending across an outer segment of said head and having openings for receiving pins of greater length than said selected pin and disposed adjacent and at opposite sides thereof, power operated means effective for moving said carrier away from said selected pin to enable adjustment of said head, and manual control means effective for optionally rendering said power means effective and ineffective.

10. In a linecasting machine, the combination of a knife adjustable to a plurality of different trim positions, a tape reader adapted to read coded signals on a tape, and means responsive to signals from said tape reader for controlling adjustment of the knife to the position indicated by the coded signals.

11. In a linecasting machine, the combination of a knife which has an adjustable opening, adjustment means for adjusting said knife opening to different trim positions, means for providing coded signals to identify different ones of said positions, and means responsive to said signals to control said adjustment means in the movement of said knife to the position represented by said signals.

12. In a linecasting machine, the combination of means for providing a first and second set of signals, matrix selecting and assembling mechanism, means responsive to said first set of signals to control the automatic operation of said matrix selecting and assemblying mechanism in the provision of cast slugs, a knife for trimming said slugs, adjustment means for moving said knife to different trim positions, and means responsive to said second set of signals to control the position to which said knife is moved by said adjustment means.

13. In a linecasting machine, the combination of a knife for trimming slugs provided by said machine, means for adjusting said knife to a plurality of different positions, means for providing a plurality of different control signals, a first means for registering a first control signal to indicate a request for a knife position adjustment, second means for registering a second one of said control signals which indicate a desired knife position, and means controlled by a third control signal to initiate adjustment of said knife by said adjusting means to the position requested by said second control signals.

14. In a linecasting machine, a knife adjustable to a plurality of different positions, a tape reader adapted to read coded signals on a tape, decoder means connected to said tape reader for decoding the control signals provided by said tape reader, a first means for registering a first signal set from said decoder means which requests a knife position adjustment, a second means for registering a second signal set from said decoder means which identifies the desired position, means controlled by a third signal for selectively initiating adjustment of the knife to the position requested, and means for inhibiting further readout of signals on the tape during the period of adjustment of the knife to a desired position.

15. In a linecasting machine, a knife adjustable to a plurality of different positions, a tape reader adapted to read coded signals on a tape, decoder means for decoding said signals, a first means for registering a first signal from said decoder means which requests a knife position adjustment, a second means for registering a second signal from said decoder means which indicates the desired position of the knife, cycle means responsive to a signal from said tape to control adjustment of the knife to the position requested, and means including said cycle means for resetting said first and second means after each adjustment of said knife to the requested position.

16. In a linecasting machine, a knife adjustable to a plurality of different positions, means for providing control signals which request movement of the knife to a desired position, a first means for registering a signal request for a knife position adjustment, a second means for registering the position requested by the signals, means controlled by a further signal for selectively initiating adjustment of the knife to the position requested, indicator means for providing a position signal indicating the position to which the knife is adjusted, and means responsive to said position signal to reset said second means.

17. In a linecasting machine, the combination of a knife adjustable to a plurality of different positions, means for providing control signals to control movement of the knife to a desired position, a first means for registering one signal set requesting a knife position adjustment, a second means for registering a second signal set which identifies the desired position, cycle means controlled by a further signal to selectively initiate adjustment of the knife to the position requested, means for resetting said second means responsive to adjustment of said knife to the requested position, and means controlled by said cycle means subsequent to completion of a cycle of said machine to reset said first means.

18. In a linecasting machine, the combination of a knife adjustable to a plurality of different slug trimming positions, a tape having coded signals, a tape reader operative to read the coded signals on said tape, decoder means for decoding said tape signals, a first means for registering a first signal set from said decoder means requesting a knife blade position change, a second means for registering a second signal set from said decoder means indicating the one of the positions requested by the tape signals, means responsive to readout of a start signal on said tape to initiate a cycle of said linecasting machine, cycle switch means operative a predetermined period after start of said cycle, and means controlled by said cycle switch means to adjust said knife to the selected position responsive only to a first and a second signal being registered on said first and second means at the time of operation of said cycle switch means.

19. In a linecasting machine, the combination of a knife adjustable to a plurality of different slug trimming positions, a tape having coded signals, a tape reader operative to read the coded signals on said tape, decoded means for decoding said tape signal, a first means for registering a first signal set provided by said decoder means requesting a knife position change, a second means for registering a second signal set from said decoder means indicating the one of the positions requested by the tape signals, means responsive to readout of a start signal on said tape to initiate a cycle of said linecasting machine, cycle switch means operative a predetermined period after start of said cycle, means controlled by said cycle switch means to adjust said knife to the selected position responsive only to a first and a second signal being registered on said first and second means at the time of operation of said cycle switch means, and means for inhibiting the production of a slug by the machine during a cycle of the machine in which a knife adjustment is made.

20. In a linecasting machine, the combination of a knife adjustable to a plurality of different slug trimming positions, control means for providing signals requesting movement of said knife to a desired position, a first means for registering a first signal provided by said control means requesting a knife position change, a second means for registering a second signal provided by said control means indicating the desired one of the positions, cycle means for initiating a cycle of said linecasting machine, positioning means including a plurality of adjustable step members movable to different positions to vary the position of said knife, power operated means for moving said knife away from said stop means, means for enabling said power operated means during said cycle and disabling said power operated means thereafter during said cycle, means for adjusting said stop means to select the indicated position for the knife while said power means are enabled, and means for yieldingly urging said knife into the position selected by said stop means responsive to disablement of said power operated means.

21. A machine as set forth in claim 20 in which said positioning means includes a rotatable turret head supporting said stop members, and motor drive means controlled to rotate said head responsive to enablement of said power operated means.

22. A machine as set forth in claim 21 which includes a detent pin for holding said head in a position as moved thereto, and a solenoid member operated with said motor drive means to pull said detent pin and release said turret head for movement.

23. In a linecasting machine for producing cast slugs, a knife movable to different positions, means for providing a set of signals indicating a desired one of the positions for said knife, control means responsive to said signal set to adjust the knife to the position indicated by said signals, and sequence means operative only after said knife is adjusted to the position indicated by said first set of signals to provide an output signal to further slug preparing means.

24. A machine as set forth in claim 21 in which said sequence means comprises a capacitor member, a charging circuit for said capacitor member completed during the period said knife is being adjusted to the desired position, and means for connecting said capacitor to provide an operating signal to said further means subsequent to adjustment of said knife to the desired position.

25. In a linecasting machine, an adjustable knife movable to different positions, input means for providing a momentary signal indicating a desired position of the knife, a first means for registering a request for the change of position of the knife including means for holding said request until reset, a plurality of register circuits, each of which is connected to register a signal for a different position of the knife including means for maintaining said registration until reset, adjustment means for adjusting the knife to the position indicated by the signal on said register circuits, and means for enabling said adjustment means in said adjustment only responsive to a signal on said first means and one of said register circuits.

26. A linecasting machine as set forth in claim 25 in which said first means includes means for providing an enabling signal to said one register circuit for a brief measured period including the period of said momentary signal, and means for thereafter inhibiting response of said register circuits to further signals from said input means during the period of the knife adjustment.

27. In a linecasting machine for producing cast slugs, readout means for reading coded characters on an information-bearing means, matrix selecting and assembling mechanism, a first means normally operative to effect the automatic operation of said matrix selecting and assembling mechanism in accordance with the information obtained by said readout means, command means for decoding the information-bearing signals, means responsive to the occurrence of a predetermined code on said information-bearing means to disable said first means, means for transmitting the output of said readout means to said command means after said disablement of said first means, an adjustable knife, and means for adjusting said knife to different positions indicated by the signals from said command means.

28. In a linecasting machine for producing cast slugs, readout means for reading coded characters on an information-bearing means, matrix selecting and assembling mechanism, a first means normally operative to effect the automatic operation of said matrix selecting and assembling mechanism in accordance with the information obtained by said readout means, command means for decoding the information-bearing signals, means responsive to the occurrence of a predetermined code on said information-bearing means to disable said first means, means for transmitting the output of said readout means after said disablement of said first means to said command means, saw means, means for controlling said saw means to cut a slug to the length indicated by the signals from said command means, an adjustable knife, and means for adjusting said knife to different positions indicated by the signals from said command means.

References Cited by the Examiner
UNITED STATES PATENTS

| | | | |
|---|---|---|---|
| 1,447,714 | 3/1923 | Drake | 199—59 |
| 1,782,468 | 11/1930 | Guest | 199—59 |

ROBERT E. PULFREY, *Primary Examiner.*

WILLIAM F. McCARTHY, Jr., *Assistant Examiner.*